United States Patent [19]

Knockeart et al.

[11] 3,735,096

[45] May 22, 1973

[54] SYSTEM FOR PROCESSING CODED PULSE DATA

[75] Inventors: Ronald P. Knockeart, Walled Lake; Frank A. Russo, Farmington, both of Mich.

[73] Assignee: The Bendix Corporation, Southfield, Mich.

[22] Filed: Dec. 13, 1971

[21] Appl. No.: 207,150

[52] U.S. Cl. ........................................235/61.11 E

[51] Int. Cl. ........................................G06k 7/10

[58] Field of Search ................235/61.11 E, 61.11 D, 235/61.12 M; 250/219 D, 219 DC; 340/146.3 K, 146.2 A, 172.5, 347 P, 347 DD

[56] References Cited

UNITED STATES PATENTS

| | | | |
|---|---|---|---|
| 3,086,121 | 4/1963 | Cockrell | 340/146.3 K |
| 3,106,706 | 10/1963 | Kolanowski et al. | 340/146.3 K |
| 3,543,007 | 11/1970 | Brinker et al. | 235/61.11 E |
| 3,636,317 | 1/1972 | Torrey | 235/61.11 E |
| 3,671,718 | 6/1972 | Genzel et al. | 235/61.12 N |
| 3,676,645 | 7/1972 | Fickenscher et al. | 235/61.11 E |

*Primary Examiner*—Daryl W. Cook
*Attorney*—Lester L. Hallacher and William S. Thompson

[57] ABSTRACT

This invention is directed to a system for processing pulse information which is coded in binary, BCD, or some other type of pulse code. The information is coded into a poluralíty of active states which represent a series of functional operations. The functional operations occur in a specific sequence, and all operations occur several times before an output is generated. Accordingly, the system is capable of distinguishing each state and of either accepting or rejecting incoming data signals, depending upon the correspondence of the incoming signals with the defined operational functions. As each state is properly received, the system sequences to receive the next state. After a complete set of states is received, the data signals are stored and the remainder of the system cleared of all processing signals. The data received during the next complete series of states is compared with the prior data stored and, if a valid comparison results, a data ready signal generated. After a preselected number of valid comparisons are made the pulse code is accepted as valid and used to actuate a utilization device.

33 Claims, 22 Drawing Figures

INVENTOR.
RONALD P. KNOCKEART
FRANK A. RUSSO
BY

INVENTOR.
RONALD P. KNOCKEART
FRANK A. RUSSO
BY [signature]

INVENTOR.
RONALD P. KNOCKEART
FRANK A. RUSSO
BY

INVENTOR.
RONALD P. KNOCKEART
FRANK A. RUSSO
BY

SYSTEM FOR PROCESSING CODED PULSE DATA

BACKGROUND OF THE INVENTION

The inventive system is primarily intended to serve as the data processing circuitry for an automatic label reading system. Accordingly, it can be best understood by referring to FIG. 7, which shows a simplified label scanning system with which the inventive system can be employed.

In FIG. 7, a Container 11 containing a plurality of coded Labels 14, 16, and 17 moves along a Conveyor 12 in a direction indicated by Arrow 13. Mounted in some convenient position is a Prism 18 which has a plurality of reflective Surfaces 19. Prism 18 is mounted for rotation so that light from a Source 21 is directed to Container 11 and reflected back to the Prism 18 as indicated by Lines 22 and 24. The reflected Light 24 is then reflected by Prism 18 to a Detector 26. Detector 26 converts the reflected light to electrical pulses which are directed to Processing Logic 25 along Output Lead 28.

Because Labels 14, 16, and 17 contain segments having different light reflecting capabilities, the reflected light is modulated in accordance with this reflective capability. Detector 26 converts the varying light to varying electrical signals and produces a train of pulses having durations dependent upon the varying signal. Accordingly, the input to the Processing Logic 25 is a square wave which is representative of the various reflective capabilities of the segments of the labels. The input to Logic 25 is thus a binary coded input which is decoded by the Processing Logic 25 so that the contents of Container 11 can be uniquely identified in accordance with the code established by the segments of Labels 14, 16, and 17.

The invention is directed to Processing Logic 25 which is used to decode and process the information to unambiguously identify Container 11.

FIGS. 1 and 2 show exemplary labels which are useful with the inventive logic circuitry. FIG. 1 shows a semicircular label but it should be understood that, in the inventive system, the label would be circular so that it has complete radial symmetry about its center point. The label is shown as semicircular simply as a convenience in pointing out the various states and logic conditions defined by the various segments of the label. FIG. 2 shows a rectangular label which can be used with the inventive system. This label can be used in conjunction with one or more similar labels so that the coded information presented to the decoding system can be increased simply by increasing the number of labels on the container.

In both labels the segments having various reflective capabilities are dimensioned so that various functional operations of the label are defined in accordance with the widths of the segments.

In the circular label partially shown in FIG. 1, the first section of the wide dark segment which circumvents the entire periphery of the label to intersect the scanning energy is used to initiate State No. 1, which is used as a label locating segment. When a container is located, the processing circuitry goes into State No. 0, which means the circuit is prepared to receive data. When the wide dark segment is scanned and verified to be within a range of widths, the segment is validated as being a label segment. Upon validation the transition from the wide dark segment to the narrow white segment initiates State No. 1.

FIG. 3*a* shows that State No. 0 exists before the wide dark segment is reached and lasts until the scanning energy reaches the first narrow white segment which starts State No. 1. FIG. 3b shows that State No. 1 lasts for the duration of the narrow white segment, the end of which signals the beginning of State No. 2.

It should be noted that the rectangular label shown in FIG. 2 also has dark and light segments defining States No. 1 and No. 2 in a manner similar to those of the circular label.

State No. 2 is a series of dark and light segments which define the coded information present on the label. It should be noted that each dark and light segment is one of two possible widths and one of two possible energy reflective capabilities. Adjacent segments have different reflective capabilities but adjacent segments can have the same or different widths. The coded segments are paired so that each pair contains one dark and one light, and also one wide and one narrow segment. Each pair of segments defines a logic condition of a logic 0 or a logic 1. Because all coded segments pairs include a wide and a narrow segment, and because segment narrow segments are equal in width, all coded segment pairs are equal in width and thus all logic conditions are defined by equal dimensions of label spacings. The logic condition defined by each pair of coded data segments is determined by the reflective capability of the widest segment in the pair. For example, the first data pair contained within State No. 2 of the circular label of FIG. 1 is a narrow dark segment and a wide light segment. The light segment dominates, and this condition is selected to represent a logic 0 condition. The fifth pair of coded data segments includes a wide dark segment and a narrow light segment. The dark segment dominates this pair, which therefore defines a logic 1 condition.

The label of FIG. 1 contains 11 coded pairs of data segments and therefore defines eleven logic conditions. As a consequence, if straight binary coding is used, the label of FIG. 1 contains 11 coded pairs of data segments and therefore defines eleven logic conditions. As a consequence, if straight binary coding is utilized there are $2^{11}$ possible combinations of 0's and 1's. Accordingly, there are 2,048 possible combinations and hence, 2,048 different identifications can be made by utilizing the label of FIG. 1. Obviously, if desired, data pairs can be added or subtracted to either increase or decrease the available information on the label.

Binary Coded Decimal (BCD) can also be used if desired. For example, if the coded information on the label of FIG. 2 is BCD and the most significant data pair is that on the left and the least significant is that on the right, the first four data pairs, respectively, represent the logic conditions 0101. In BCD this combination represents the character "5." The next four data pairs, respectively, represent the logic conditions 1001, and in BCD define the character "9." The label of FIG. 2 thus identifies the number "59" in BCD. However, a straight binary coding can be used to identify any one of $2^8$ or 256 unique combinations. It will be appreciated that both label configurations can be encoded using either BCD or straight binary coding. Also, other types can be used if desired.

Referring again to FIG. 1 and FIG. 2, immediately following State No. 2 is a narrow dark segment which is identified as State No. 3 The segment which defines State No. 3 has a width which is equal to the narrow width of the coded segments and therefore is used primarily to separate the coded information segments from the wide light segment which defines State No. 4. FIG. 3*d* shows that State No. 3 lasts for the duration of the narrow segment. State No. 4 is different in reflectivity from the segment which defines State No. 0 but can be of an equal width, if desired. The segments defining States 0, 4, and 8 are wider than the other segments in order to more easily and reliably distinguish them from the other segments. The State 4 segment is used to indicate that a complete sequence of the preceding segments which define States 1 to 3 has been scanned, and indicates that all coded data has been scanned. At the end of State 4 the logic circuitry is prepared to do either one of two things: For the circular label of FIG. 1, after a complete scan of State 4, the logic circuit is prepared to receive a series of data which is identical to that received during the first four states but which comes into the logic circuitry in reverse order. For the rectangular label of FIG. 2, and when a single label is present upon the container, State 4 indicates that a complete scan of a label has been effected and that the data is ready for processing within the logic circuitry. However, when a plurality of rectangular labels are placed upon Container 11, the second label will preferably be upside down with respect to the first label so that the first segment scanned on the second label will be of a reflective capability which is opposite from that of the State 1 segment of the first label. In this case, State 4 of the first label will be used to indicate termination of the first label and to prepare the logic circuitry to receive data from the second label in reverse order from that of the first label. Thus, for the second label the coded data segments are preceded by a wide light segment instead of a wide dark segment.

The similarity of the two labels shown in FIGS. 1 and 2 will be appreciated in that they both define a series of functional states which are quite similar. That is, the first half of the circular label is identical to one rectangular lable, and the second half of the circular label is identical to a second, inverted rectangular label. This becomes more evident as the discussion proceeds.

Referring again to the label of FIG. 1, at the completion of the scanning of the light center of the label which defines State 4 the narrow dark segment which defines State 3 is again scanned, at this instant the segment defines State 5. State 5 is used to separate State 4 from the data segments which make up State 6. State 5 therefore also serves as an initiation segment for preparing the logic circuitry to receive data during State 6. The data received during State 6 is identical to that received during State 2 but is in reverse order. The coincidence of States 4, 5, and 6 with the various segments can be seen in FIGS. 3*e*, 3*f*, and 3*g*. In each instance, the particular state begins and ends with the particular segment which defines it.

At the completion of State 6 the narrow light segment which defines State 1 is again scanned and then defines State 7. State 8 separates the coded information from the wide dark segment which defines label termination State 8. This segment circumvents the periphery of the label and accordingly is used to define both States 0 and 8. This wide dark segment therefore defines both the label initiation and the label termination data, and accordingly the orientation of the label during a scan is of no consequence. The only requirement for a valid scan is the passage of the scan line through the label center, which defines State 4.

In comparing the rectangular label of FIG. 2 with the circular label of FIG. 1 and remembering that a second rectangular label would be rotated 180° with respect to the first label of FIG. 2, the first five states would be identical for the two labels. The last four segments would also be identical by utilizing the two light segments of the rectangular labels in the same manner as the center of the circular label. Thus, when using two reversed rectangular labels, State 4 will be defined by the two wide light segments of the two labels, and State 5 of the second label would be defined by a narrow dark segment. The coded information of State 6 would be received in the order of a light segment and then a dark segment; this order is the reverse order from the first rectangular label but is the identical order of the second half of the circular label. The second rectangular label would be terminated on a narrow light segment and then a dark wide segment, the same as the second half of the circular label. All States 0 through 9 of the circular label are therefore repeated when two mutually inverted rectangular labels are used. This feature is very advantageous because it permits the use of very similar logic circuitry irrespective of the label configuration. Consequently, any particular system can be utilized with either circular or rectangular labels simply by providing a means for selecting the label configuration and number.

As will be more fully described hereinafter, a plurality of circular labels can also be used on a single container. When this is done, the labels should be separated such that the complete scanning of the State 4 center of a label is effected before starting to scan the State 4 center of a succeeding label. Unless this constraint is followed, the logic circuitry must be equipped with a means for separating the data received from each label.

A plurality of alternately inverted rectangular labels can also be used by reversing the role of the wide dark and light segments for the inverted labels. Thus, for the labels arranged so that the wide light segment is scanned first, the wide light segment is the label locating segment and the wide dark segment is the label terminating segment. This is a convenient operation because label counting circuitry can be added to the logic circuit so that a wide choice in the numbers is available simply by setting a selector switch.

CROSS-REFERENCE TO RELATED APPLICATIONS

Patent application Ser. No. 207,206 titled "Coded Label for Automatic Reading Systems" filed by Frank A. Russo and Ronald P. Knockeart of even date herewith and also assigned to The Bendix Corporation, describes circular and square labels which can be used with the invention described herein.

Patent application, Ser. No. 207,036 titled "Rotating Prism Scanning System Having Range Compensation" filed by Ronald P. Knockeart of even date herewith and assigned to The Bendix Corporation, describes an optical system useful with the inventive system.

Patent application, Ser. No. 207,214 titled "System for Converting Modulated Signal to Digital Outputs" filed by Ronald P. Knockeart and John R. Wilkinson of even date herewith and assigned to The Bendix Corporation, describes analog circuitry useful in formulating the square wave pulse information utilized as the inputs to the inventive system.

SUMMARY OF THE INVENTION

In the inventive system the coded information is received from the label and is synchronized with a clock pulse. At the same time the incoming coded pulse is used to generate two strings of transition pulses which coincide with the transitions of the reflected energy from dark to light and from light to dark. It will be appreciated that throughout the description "light," "white," and "high reflectivity" are used interchangeably; this also is true of "dark," "black," and "low reflectivity."

The coded information is directed to a light bar counter and a dark bar counter. The bar counters are gated by the reflected signals of the light and dark label segments, respectively, so that pulses from a clock are injected into the respective counters in accordance with the widths of the light and dark bars on the label. The counts present in the light and dark bar counters are thus proportional to the widths of the light and dark bars on the scanned label.

The transitions of the reflected energy between the light and dark segments are used to gate a light count buffer and a dark count buffer so that these buffers, respectively, receive the strings of pulses representative of the widths of the light segments and the dark segments. The total pulse counts present in the light count buffer and the dark count buffer are added to determine that the total pulses counted are within specified maximum and minimum values to thereby verify that the scanned pulses have been derived from label segments rather than from dirt spots or other environmental conditions present on the container or label.

After a determination has been made that the total count is valid, the pulse-count present in the light count buffer is compared with that present in the dark count buffer and the highest of these two counts is used to determine the logic condition for that particular pair of segments. Thus, the logic 0 and logic 1 conditions of the coded pulse train are determined by the highest count present in the two buffers. The logic conditions are therefore determined by the widest segment present in the coded segment pairs. The various outputs emanated are directed to a state counter which sequentially sets the remaining portions of the logic circuitry in accordance with States 1 through 9 explained hereinabove with respect to FIGS. 1 and 2.

After the logic condition of two consecutive coded segments forming a coded pulse pair is established as either a 0 or a 1, the logic condition is injected into a bit-assembly register. The bit-assembly register receives a logic 1 or 0 for each pair of coded pulse segments on the label until all pairs are represented by a 1 or 0 in the bit-assembly register. After the bit-assembly register receives a logic pulse for each coded pair of segments on the label (11 for the label shown in FIG. 1), it stores the assembled pulse train. The state counter then actuates the bit-assembly register so that it can receive the next string of 11 pulses in reverse order. After the entire second string of pulses has been injected into the bit assembly register, the two strings of pulses are compared and, if they are identical, an increment counter is actuated to ultimately result in the generation of a valid scan indication. If the two pulse trains are not identical the logic circuitry is cleared and the process repeated.

The above operation is repeated for each complete scan of the label and, after a preselected number of valid scan indications are generated, the data present in the bit-assembly register is passed to a utilization device through an output register. The number of consecutive valid scans required for presentation of the assembled pulse trains to the utilization circuitry is a function of the desired reliability of the system. Therefore, as the required reliability increases the number of consecutive valid scans also increases. However, the complexity of the logic circuitry also increases. An excellent trade-off between reliability and complexity can be realized by requiring two consecutive valid scans for each valid scan indication, and two valid scan indications for passage of the data to the utilization device. Thus, four valid scans must be effected, but they need not be consecutive so long as they occur in pairs of consecutive scans. In other words, the first two consecutive valid scans yield one valid scan indication, and the next two consecutive valid scans yield the second valid scan indication, irrespective of the occurrence of the second pair with respect to the first pair, and irrespective of the presence of other valid scans between the two pairs of consecutive scans.

After two valid scan indications are generated, the assembled pulse train is transformed in parallel to the utilization device. The utilization device can be a visual digital readout, escort memory, diverter, or a computer which processes the data to activate some form of control device, printing device, or graphic plotting device.

The inventive system generates logic 1's and 0's by comparing the reflective capabilities of two segments within a coded pair. This is a major advantage and overcomes one of the major shortcomings of the prior art systems which depend on absolute segment widths for logic 1 and 0 generation. In the inventive system the total width of two segments is established as being within a range and only one of the segment widths is measured over a range, and this is done for label validation purposes, not to read the label.

BRIEF DESCRIPTION OF THE DRAWINGS

FIG. 5 consists of FIGS. **5*a* to 5*c* wherein

FIG. 6 consists of FIG. **6*a*–6*c* wherein

Figure 7:
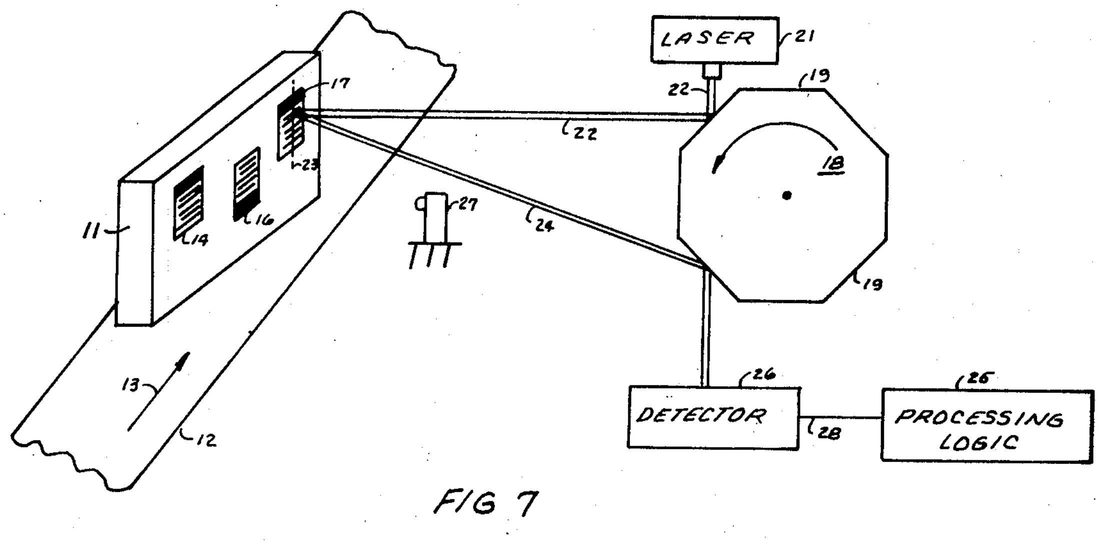

FIG. 7 is a simplified showing of a scanning mechanism with which the inventive system can be employed.

Figure 2:
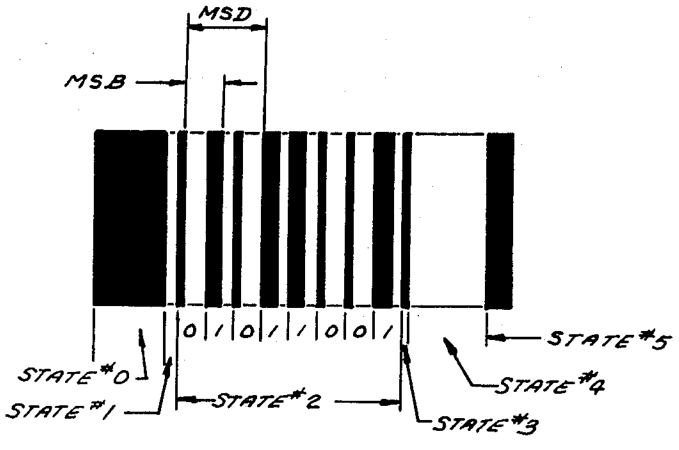
FIG. 2 shows a rectangular label of which one or more can be used with the inventive system.
Figure 8:
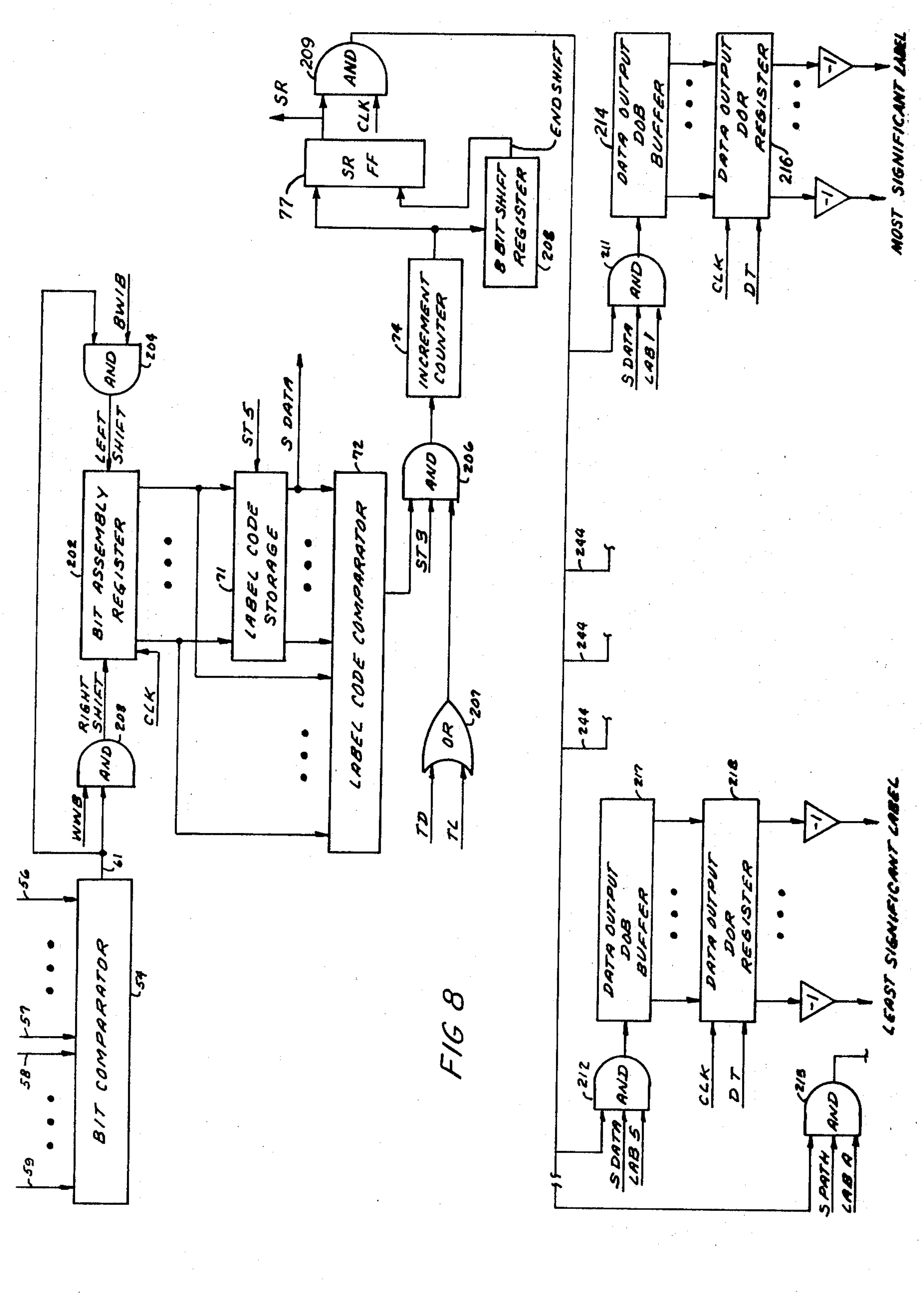

FIG. 8 is a preferred embodiment of logic circuitry which can be used with one or more of the rectangular labels shown in FIG. 2.

Figure 9:
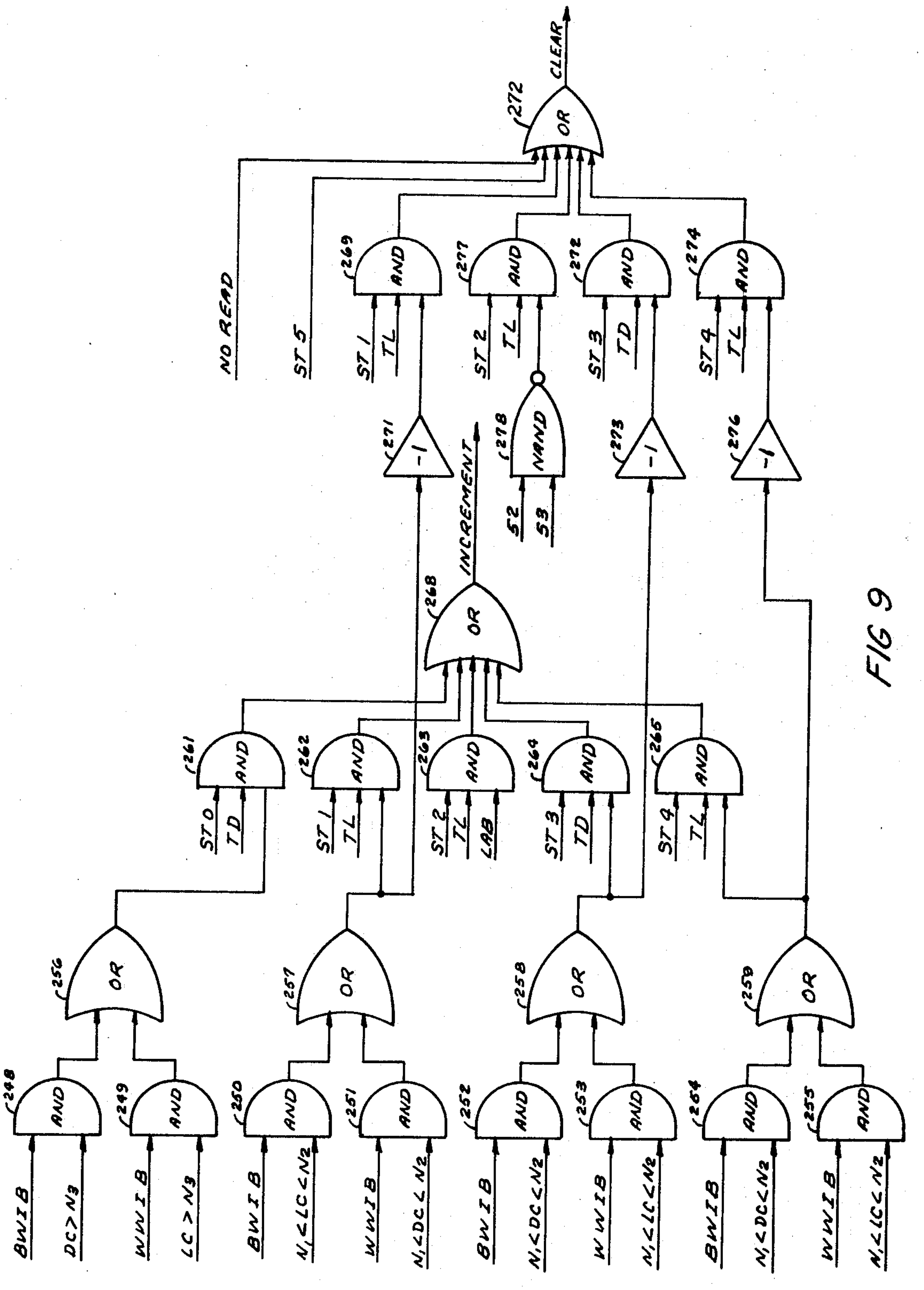

FIG. 9 is a preferred embodiment of a counter useful with rectangular labels.

Figure 10:
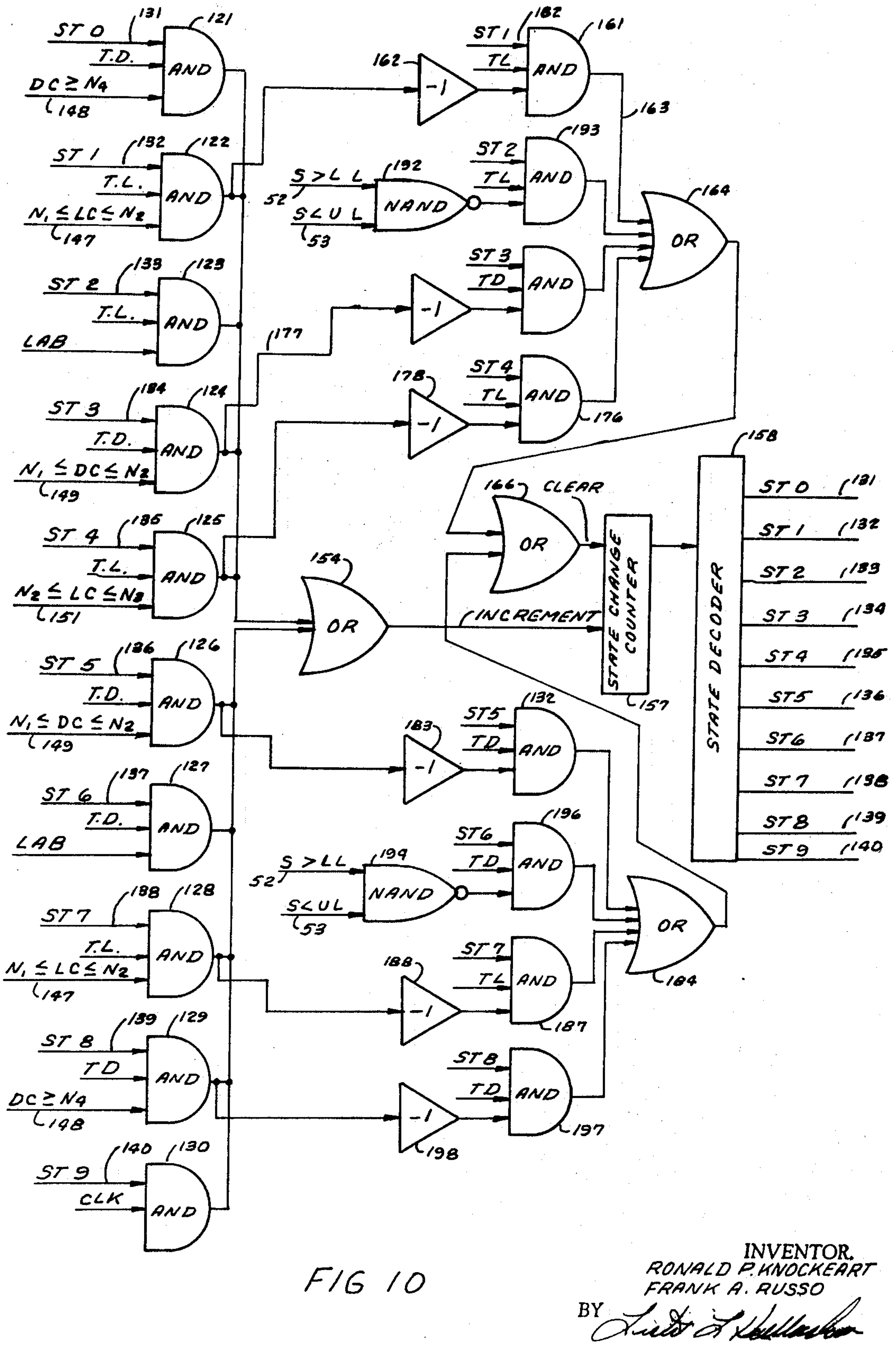

FIG. 10 is a preferred embodiment of a state counter useful when either circular or rectangular labels are scanned.

Figures 11, 14:
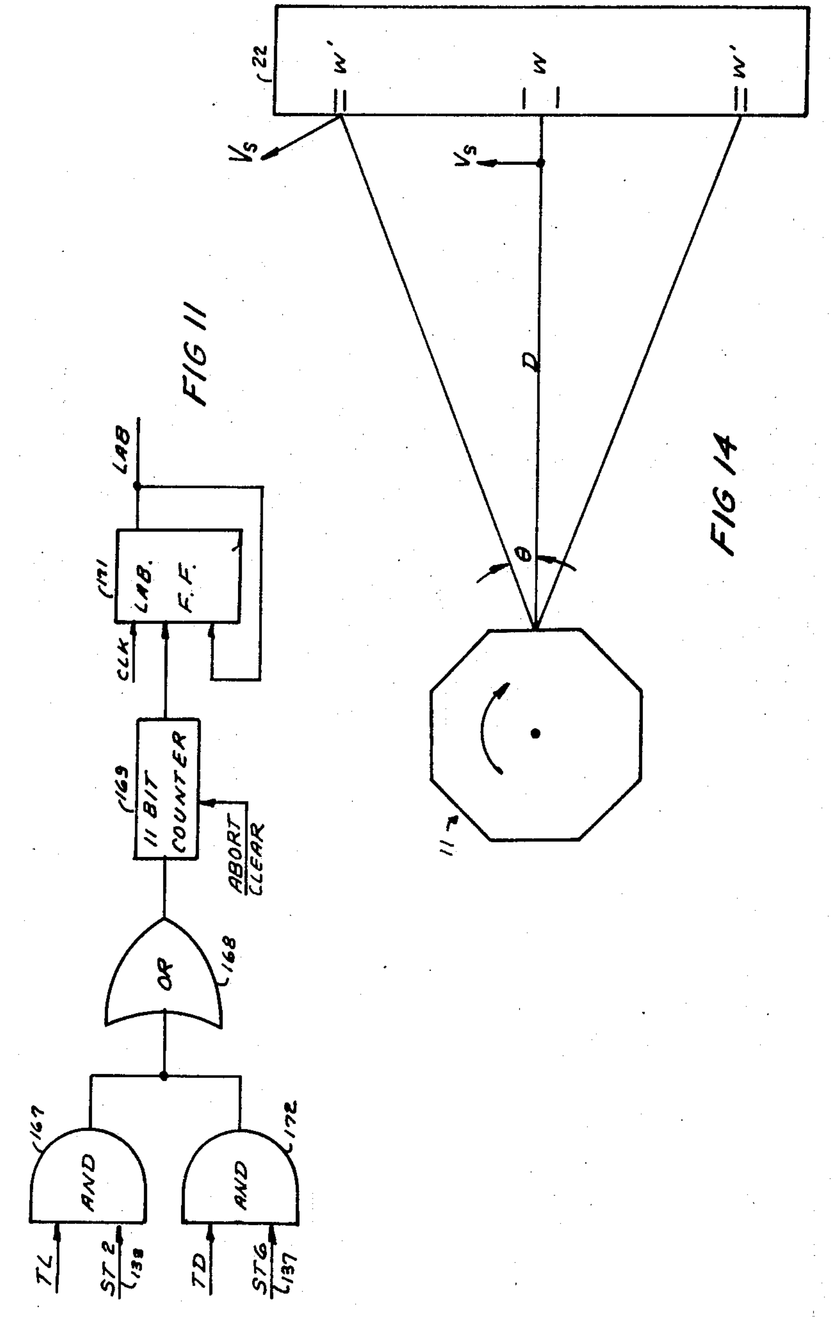

FIG. 11 shows logic circuitry which can be used to generate the required LAB signal.

Figure 12:
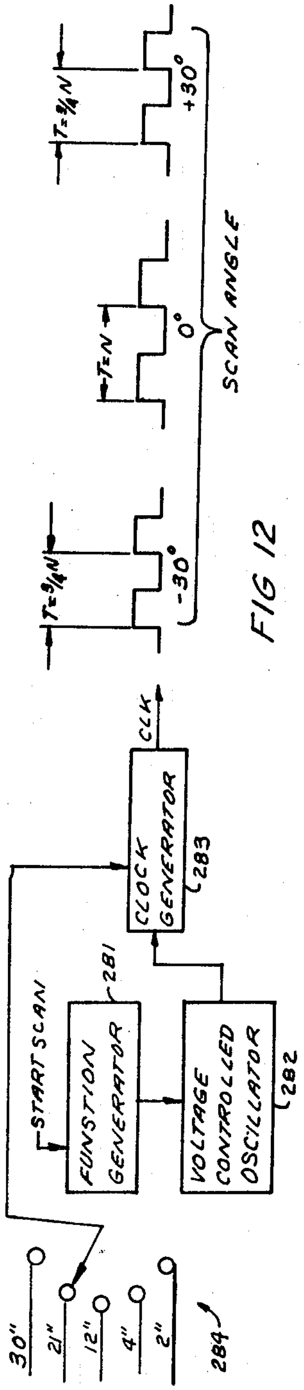

FIG. 12 is a preferred embodiment of a system for changing the clock rate as a function of scan angle and scan distance.

Figure 13:
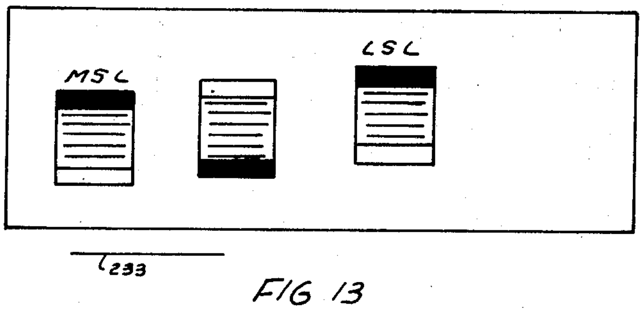

FIG. 13 shows the identification of labels as the most significant and least significant.

FIG. 14 shows how the scan speed and apparent bar width vary with scan angle and distance.

Figure 15:
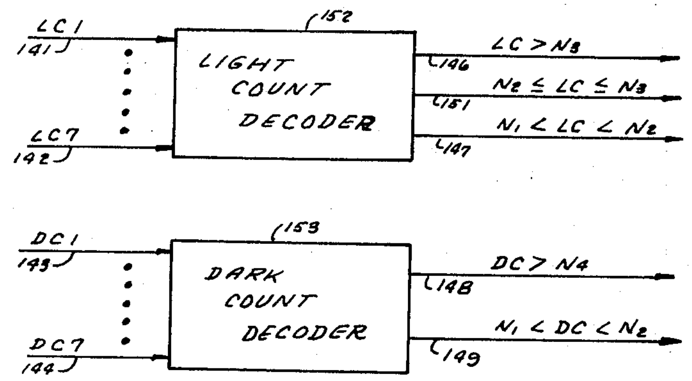

FIG. 15 shows the Light and Dark Count Decoders which generate the count inputs for the State Counters shown in FIGS. 9 and 10.

Figure 16:
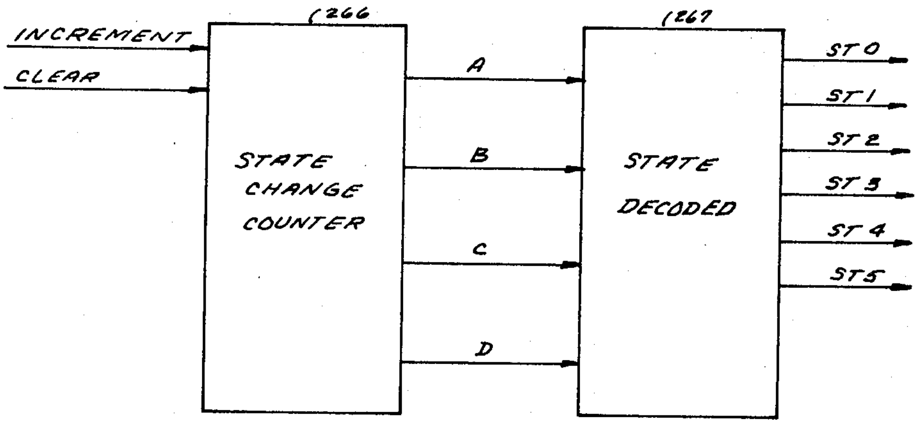

FIG. 16 shows the State Change Counter and State Decoder used with the State Counter of FIG. 9.

Figure 17:
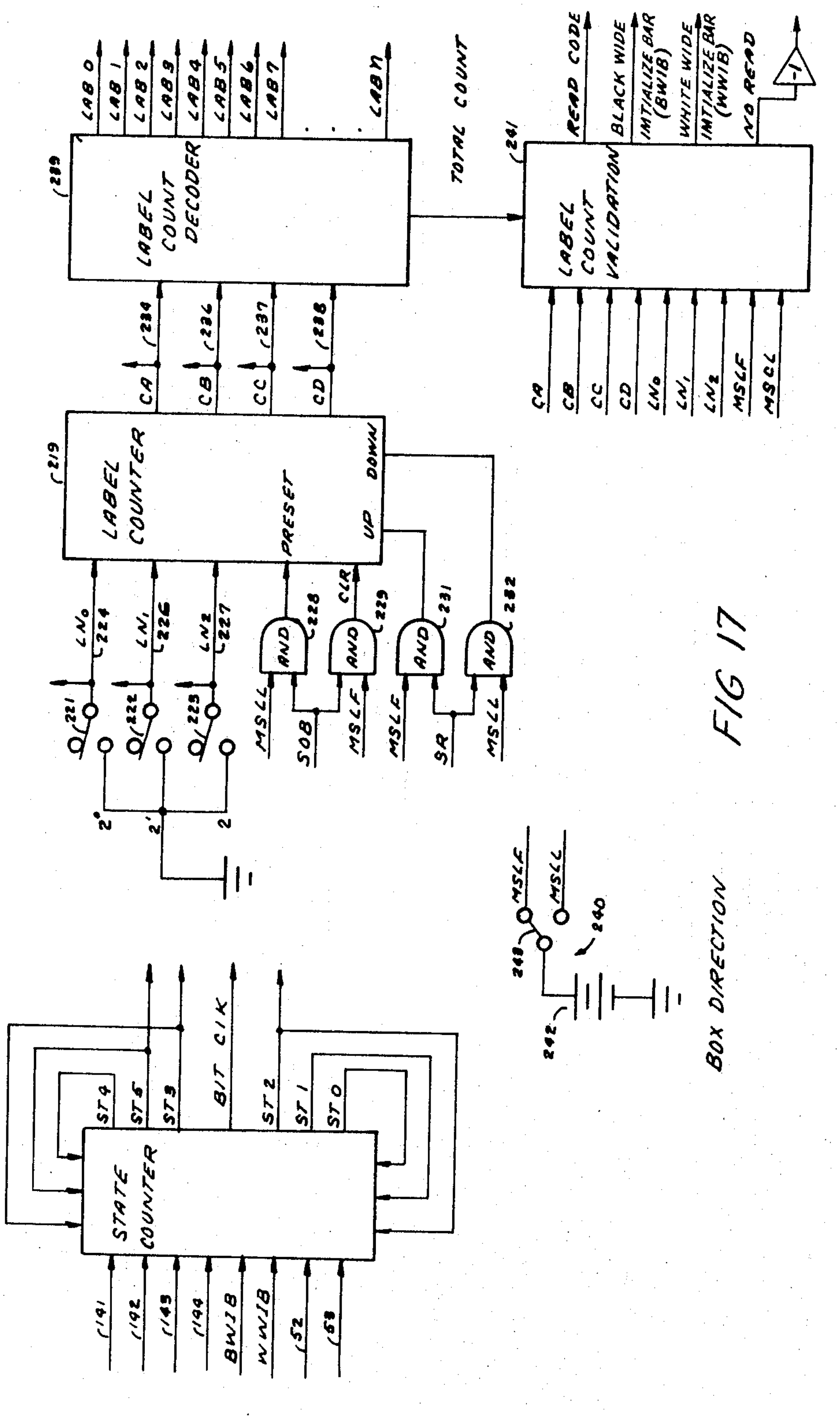

FIG. 17 shows the State Counter, Label Counter, and Label Count Decoder used with the embodiment shown in FIG. 8.

DETAILED DESCRIPTION

Figures 1, 3:
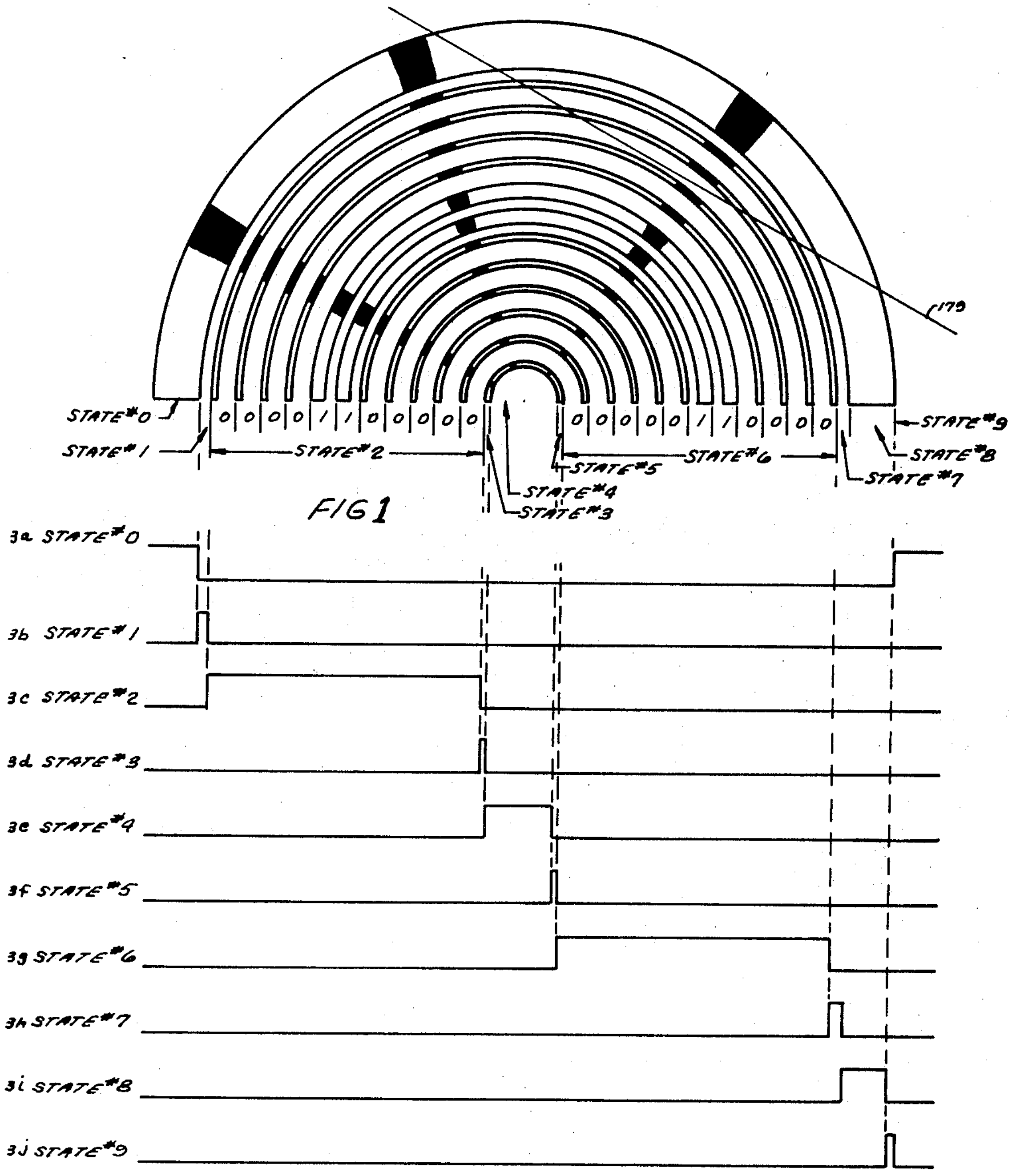
FIG. 1 shows a one-half of a circular label useful with the inventive system.
FIG. 3, consisting of FIGS. **3*a* to 3*j*, relates label States 0 to 9 to the segments of the circular label shown in FIG. 2**.

FIG. 7 shows how transmitted Energy 22, such as light from a Laser 21, is directed to Object 11 by Reflective Surfaces 19 of Prism 18 so that reflected Energy 24 is received by a Detector 26. Detector 26 includes a system for converting the reflected energy to electrical signals and therefore can include a photomultiplier tube or some other similar unit. Detector 26 also includes analog processing circuitry which converts the electrical signal into a binary wave train. Accordingly, if the circular label shown in FIG. 1 is scanned by the transmitted energy, the waveform shown in FIG. 6a will be present upon Line 28 and serve as an input to Processing Logic 25.

Figure 4A:
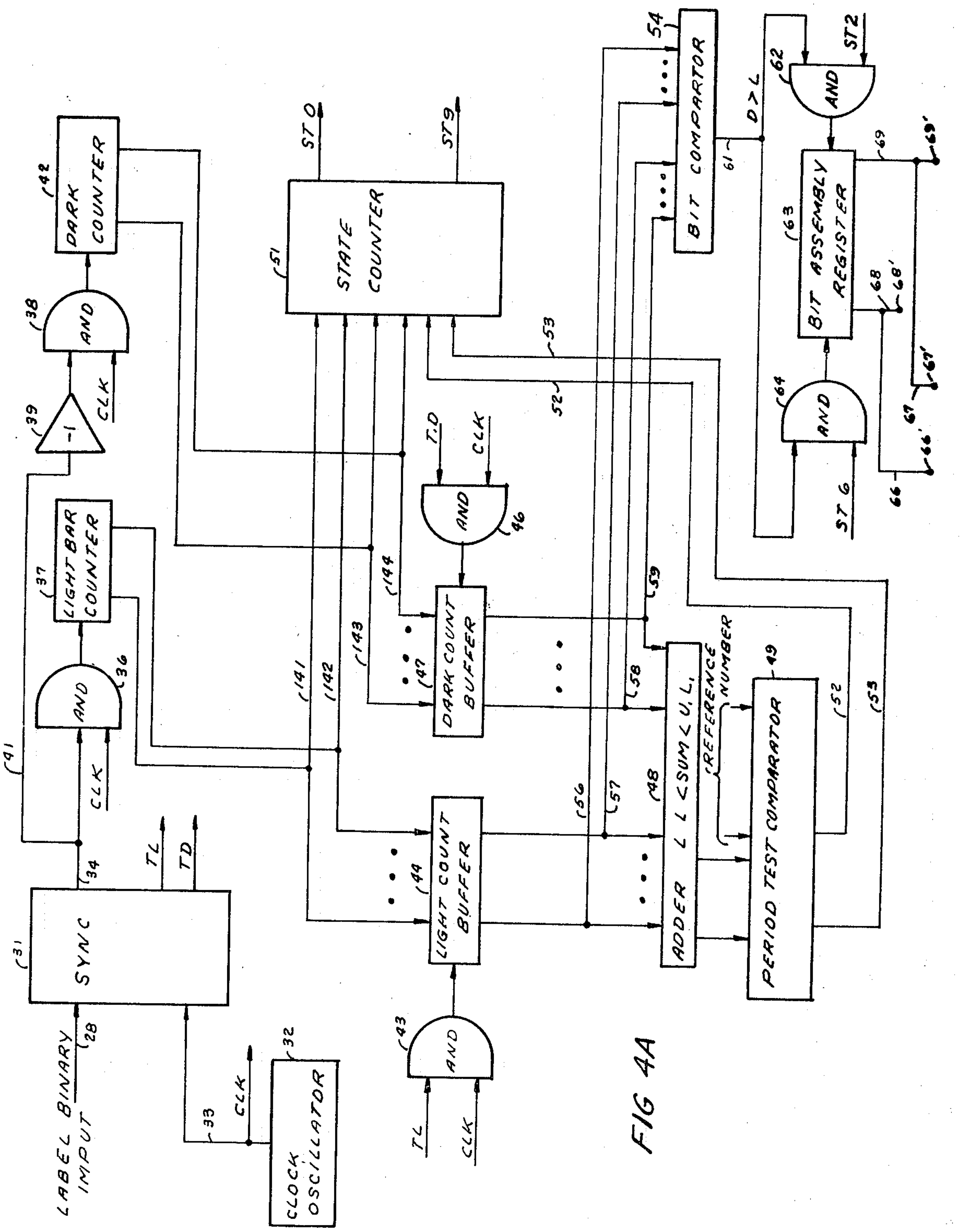
FIG. 4, consisting of FIGS. **4*a* and 4*b*, is a preferred embodiment of a logic circuitry which can be used with the circular label of FIG. 1**.
Figure 4B:
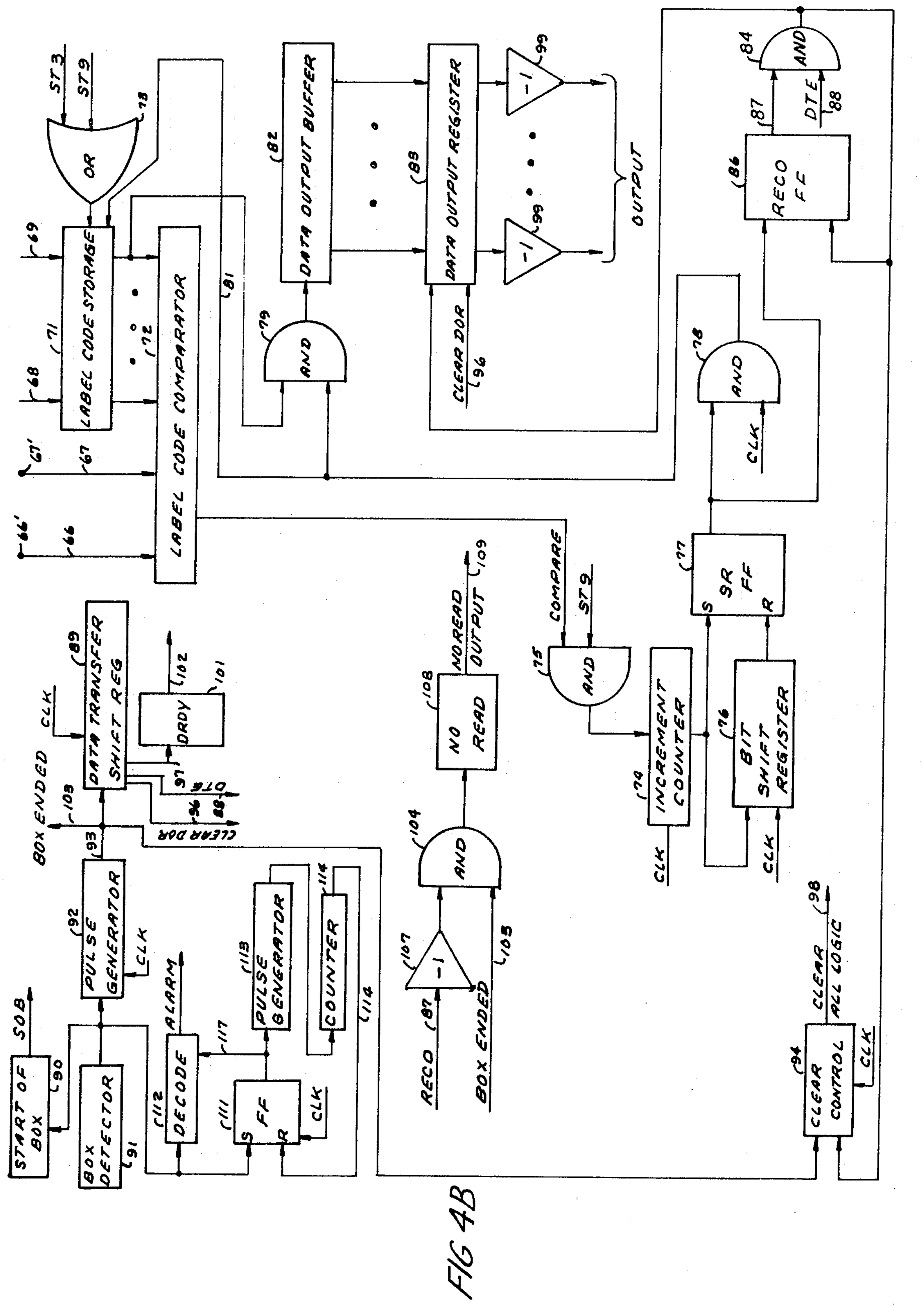

FIGS. 4a and 4b together show a preferred embodiment of the logic circuitry contained within Processing Logic 25. In FIG. 4a, Input Terminal 28 is shown serving as an input to a Synchronization Circuit 31, which also receives a clock input from a Clock Oscillator 32. Terminal 28 is shown in FIG. 7 as receiving the output of Detector 26. Clock Oscillator 32 has an Output Lead 33 upon which the clock signals are present during the entire time that the oscillator is running. It should be noted that these signals are applied to various AND gates throughout the logic circuitry, and therefore the "CLK" inputs shown throughout the logic circuit receive the input from Clock Oscillator 32 (the connecting lines are omitted for convenience and clarity).

Synchronizing Circuit 31 is a standard configuration circuit and is utilized to synchronize the input waveform present on Input Terminal 28 with the clock oscillator input. Synchronization Circuit 31 also serves to generate the TL and TD pulse trains shown in FIGS. 6b and 6c, respectively. The TL and TD waveforms are dependent upon the transitions of the input waveform received as the result of scanning the circular label of FIG. 1. The TL pulse train of FIG. 6b has a pulse for transition from the high level to the low level, and thus the pulses of the TL pulse train occur for each transition from a light bar to a dark bar. In similar manner, the TD pulse train has a pulse for each transition from a dark bar to a light bar. The TD and TL pulses are illustrated as single pulses for simplicity and clarity, actually a series of very narrow and closely spaced pulses are generated for each transition of reflective capability.

The binary input signal present on Input Terminal 28 is also present on Output Terminal 34 of Sync Circuit 31 but is synchronous with the clock oscillator. AND Gate 36 receives the coded waveform (FIG. 6a) and also a clock input (CLK) from Oscillator 32. Accordingly, pulses from the CLK input are injected into Light Bar Counter 37 during the entire period of time that the light bar level exists in the binary input received from Detector 26.

The binary input signal present on Output Terminal 34 of Sync Circuit 31 is also applied to one input of another AND Gate 38 through an Inverter Circuit 39 by way of Lead 41. AND gate 38 also receives the CLK input from Oscillator 32 so that pulses are injected into Dark Bar Counter 42 while the binary input signal is at the low level.

Figures 5A, 5B, 5C, 6A, 6B, 6C:
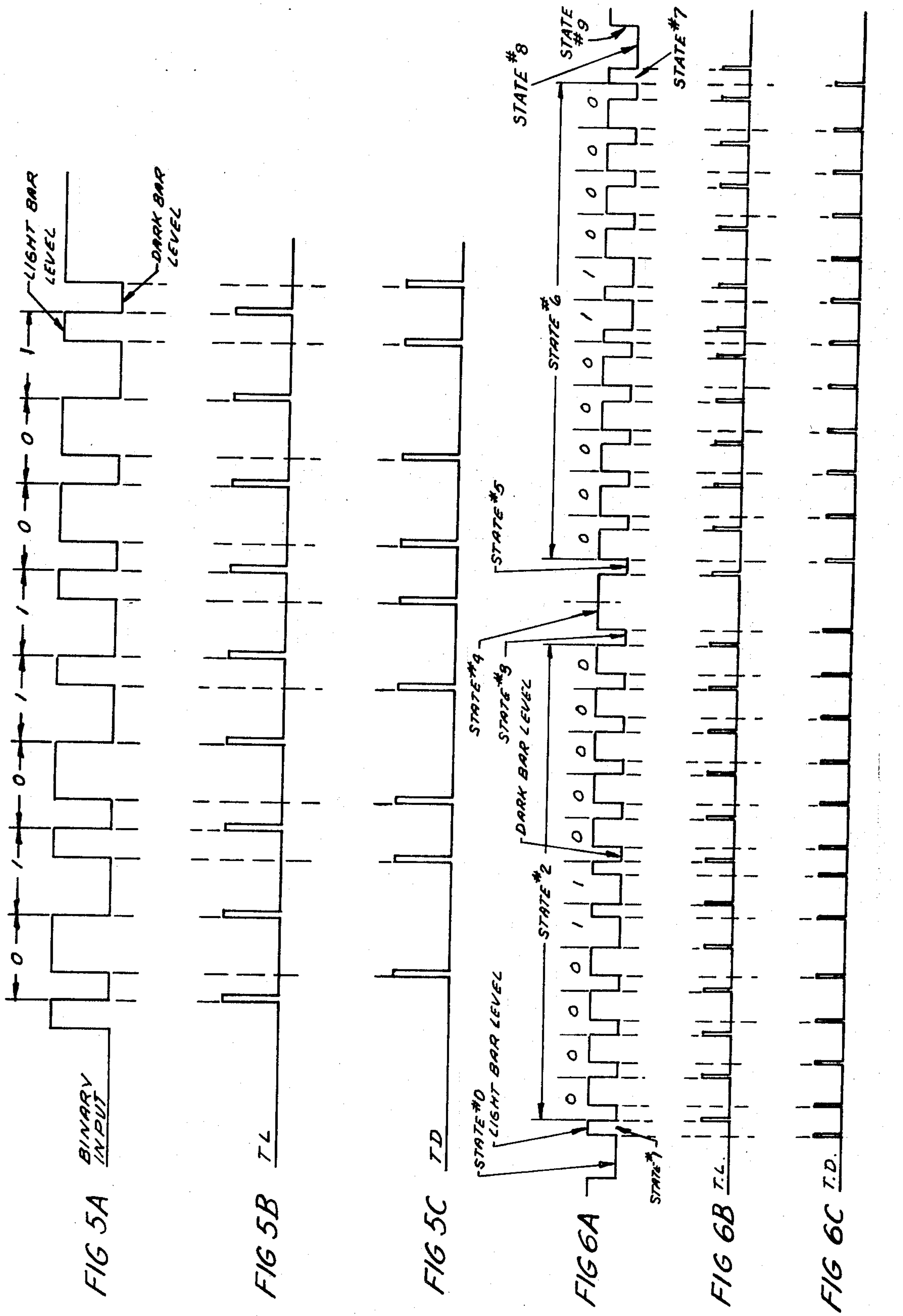
FIG. 5*a* shows the binary input received from the rectangular label shown in FIG. 2.
FIG. 5*b* shows the TL signal generated by the think circuit when the binary input of FIG. 5*a* is input to the system.
FIG. 5*c* shows the TD pulse string generated when the binary input of FIG. 5*a*** is injected into the system.
FIG. 6*a* shows the binary input received when the circular label of FIG. 1 is properly scanned through the center.
FIG. 6*b* shows the TL signal generated when the binary input of FIG. 6*a* is injected into the inventive system.
FIG. 6*c*** shows the TD signal generated when the binary input of FIG. 6a is injected into the inventive system.

An AND Gate 43 receives the TL signal shown in FIG. 6b and the CLK signal from Clock Oscillator 32 as inputs. Therefore, when the TL signal is generated at the transition from the light bar level to the low bar level, AND Gate 43 generates an output pulse which actuates Light Count Buffer 44. The pulses counted by Light Bar Counter 37 are then transferred to Light Count Buffer 44. Light Count Buffer 44 thus contains a digital number which is representative of the total width of the light segment scanned between the two consecutive TL pulses.

An AND Gate 46 receives the TD signal shown in FIG. 6c and the CLK signal from Clock Oscillator 32 to actuate a Dark Count Buffer 47. Dark Count Buffer 47 therefore operates in a manner similar to Light Count Buffer 44 to receive a count representative of the width of the dark bar segment scanned between two consecutive TD pulses. Reference to FIGS. 6a, 6b, and 6c shows that one TL and TD pulse is generated for each pair of data segments. For this reason, the total count of pulses within Buffers 44 and 47 is proportional to the total width of a pair of coded segments. The pulse counts individually contained within Light Count Buffer 44 and Dark Count Buffer 47 therefore are each respectively indicative of the widths of the dark and light data segments contained within a pair of data segments defining a digital pulse space. Accordingly, these two strings of pulses are injected in parallel to Adder 48. After being added in parallel, the data are injected into a Period Test Comparator 49. Period Test Comparator 49 is used to verify the width of the digital pulse spaced defined by the pair of data segments and thereby positively indicates that a valid pair of data segments has been scanned instead of simply a dark and light spot which may incidentally sequentially appear on the container or some other place within the scan environment. This is accomplished by injecting a reference number representing the lower limit and upper limit permissible for the total width of the scanned bars into Test Comparator 49 and comparing the scanned count received from the dark and light segments with the reference count. When a valid determination is made, a lower limit signal and an upper limit signal are respectively injected into a state Counter 51 via Lines 52 and 53.

State Counter 51, which is more fully described hereinafter, is used to generate state signals 0 through 9 so that the logic circuit operates consistently with the states defined with respect to the labels of FIG. 1 and 2 and the pulse trains shown in FIGS. 5*a* and 6*a*.

A Bit Comparator 54 also receives inputs from Light Count Buffer 44 and Dark Count Buffer 47. The output lines of Light Count Buffer 44 are connected to Bit Comparator 54 by way of Terminals 56 and 57, while the output signals from Dark Count Buffer 47 are coupled to Bit Comparator 54 by way of Leads 58 and 59. It should be understood throughout the description that the number of leads connecting the various circuits is actually substantially higher than the two shown for each circuit as indicated by the dots which appear between the leads connecting each circuit. In actuality there would be a lead for each bit of information running between the two circuits. An abbreviated showing is used in order to simplify the drawing and the description.

Bit Comparator 54 compares the number of bits received from Light Count Buffer 54 and Dark Count Buffer 47 to determine which count is greatest. When the dark count exceeds the light count it indicates that a dark segment for the data pair scanned was wider than the light segment, and therefore a signal is provided on Output Lead 61. Because the dark count exceeded the light count, a logic 1 condition is indicated for the processed pair of data segments. This signal is directed to an AND Gate 62 which also receives the CLK input from Oscillator 32 and a State 2 input. Therefore, because State 2 has been successfully processed in State Counter 51, a State 2 signal is present at the input of AND Gate 62 and a logic 1 input is provided to Bit Assembly Register 63.

If the weight comparison of the contents of Light Count Buffer 44 and Dark Count Buffer 47 performed in Bit Comparator 54 shows that the light count exceeds the dark count there is no output signal present on Output Lead 61. This represents the 0 logic condition which is shown in FIG. 1 as occurring when the light segment width is in excess of the dark segment width. With no pulse on Line 61, AND Gate 62 yields no pulse and the input to Bit Assembly Register 63 is a logic 0.

It will also be noted in FIG. 4 that the output signal present on Output Terminal 61 of Bit Comparator 54 is directed to an AND Gate 64, which also receives a clock input (CLK) and a State 6 input. Because State 6 is a logic 0 condition for all segments of the FIG. 1 label except the second scan across the coded segments, AND Gate 64 does not supply a pulse to Bit Assembly Register 63 in any state except State 6. This condition is desirable because, in the first half of the scanning of the circular label of FIG. 1, the input data is directed to the Bit Assembly Register 63 from the right to left through AND Gate 62. However, as will be more fully explained hereinafter, after the completion of the State 4, which is the center of the circular label shown in FIG. 1, the data is received from the label in reverse order from that of the first three states. Therefore, AND Gate 62 is disabled because of the absence of a State 2 input and AND Gate 64 is actuated by the presence of the State 6 input so that the received data is injected into Bit Assembly Register 63 in the reverse order from the State 2 order. Thus, the data is injected into Register 63 in the same sequence for States 2 and 6, and a direct comparison of the two sets of data received from both halves of the circular label is possible.

The operation up to this point has described how 1 bit of data is received by the bit assembly register because of the scanning of one pair of coded data segments contained within the State 2 portion of the circular label of FIG. 1. After the completion of one segment of data, the entire procedure is repeated in that the segments of the second pair are counted in the Light Bar Counter 37 and Dark Bar Counter 42, and the counts are subsequently injected into Light Count Buffer 44 and Dark Count Buffer 47 when the TL and TD signals, respectively, actuate AND Gate 43 and 46. This pair of data bits is then also injected into Bit Comparator 54 to generate a logic 1 or logic 0 on Output Terminal 61 dependent upon the comparative weight of the light bar count and dark bar count. This process continues until a logic 1 or logic 0 is injected into Bit Assembly Register 63 for each pair of data segments contained within State 2 of the label being scanned. Accordingly, for the exemplary labels shown in FIGS. 1 and 2, eleven and 8 bits of data, respectively, will be sequentially injected into Bit Assembly Register 63.

Bit Assembly Register 63 has two Output Terminals 68 and 69 which are shown connected to Label Code Storage Circuit 71 shown in FIG. 4*b*. Output Leads 68 and 69 are also respectively connected to Label Code Comparator 72 by way of Leads 66 and 67. For convenience, Leads 66 through 69 are identically labeled in FIGS. 4*a* and 4*b* and are shown having Terminals 66' through 69'. It should therefore be understood that the identical numbering of leads and terminals in FIGS. 4*a* and 4*b* and the use of Terminals 66' to 69' is done to show that these are the same parts in both figures, and FIG. 4*b* is a continuation of FIG. 4*a*.

The 11 bits of data assembled in Bit Assembly Register 63 are transferred to Label Code Storage Circuit 71 at the end of the coded information. Label Code Storage Circuit 71 receives an input from OR Gate 73 which is actuated by a State 3 and a State 9 signal, and also by an input received from AND Gate 78, which will be described hereinafter. Reference to FIG. 1 shows that at the end of State 2 a State 3 signal is generated because of the scanning of the dark segment which immediately follows the coded information. This signal is input to OR Gate 73 so that the stored data in Label Code Storage Circuit 71 and the data from the last scan present in Bit Assembly Register 63 are compared in Label Code Comparator 72.

If the information present in Bit Assembly Register 63 at this instant is the first half of the first scan, there is zero information in Label Code Storage 71, and accordingly no signal is generated in Label Code Comparator 72. However, after the completion of the second half of the first scan of the circular label of FIG. 1, identical information is present in Bit Assembly Register 63 and Label Code Storage 71, and Label Code Comparator 72 generates a compare signal representing the successful comparison of two successive sets of coded information.

The compare signal generated by Label Code Storage Comparator 72 is presented to AND Gate 75, which also receives a State 9 and a clock (CLK) input. Accordingly, at the end of State 9, that is, when the end of the label is indicated by the generation of a State 9 signal as seen in FIGS. 1 and 3, AND Gate 75 applies a pulse to the input terminal of Increment Counter 74. After Increment Counter 74 has received a preselected number of compare signals through AND Gate 75, it generates an input pulse to Shift Register 76. The number of inputs which Increment Counter 74 must receive before a pulse is applied to Shift Register 76 is dependent upon the reliability desired for the system. For example, a compare signal input to AND Gate 75 results from the one successful scan of the circular label of FIG. 1. Accordingly, if more than one scan is desired before actuation of Shift Register 76, Increment Counter 74 will require the input of more than one signal before enabling Shift Register 76. Therefore, if four scans are desired before an incrementation of Shift Register 76 occurs, Increment Counter 74 will be a four-increment counter.

The output from Increment Counter 74 is also used to set a Flip-Flop 77. The output of Shift Register Flip-Flop 77 is applied to AND Gate 78, which also receives a CLK input from Oscillator 32. After Flip-Flop 77 has been set by Counter 74, the CLK signals applied to AND Gate 78 appear on Line 81, which is coupled to the output of AND Gate 78. The output of AND 78 is applied to the Label Code Storage Register 71 as a series of right-shift clock pulses.

Shift Register 76 is an eleven-bit register, and therefore the setting of Flip-Flop 77 allows precisely eleven bits to be injeted into the Label Code Storage Register 71. When register 76 has shifted 11 times it generates an output to reset Flip-Flop 77 and, accordingly, at the end of the eleven clock pulses AND Gate 78 is deactuated.

The eleven pulses from AND Gate 78 during the Set condition of Flip-Flop 77 are applied over Line 81 to AND Gate 79, which also receives an input from Label Code Storage Register 71. The eleven clock pulses which are passed through AND Gate 78 during the Set condition of Flip-Flop 77 are also applied to OR Gate 73 by way of Line 81. Therefore, while these eleven clock pulses are present, the information contained in Label Code Storage 71 is transferred to Data Code Output Buffer 82 through AND Gate 79.

The final transfer of data from Buffer 82 to Data Output Register 83 is effected when AND Gate 84 is actuated. AND Gate 84 is actuated by Read Code (RECO) Flip-Flop 86 and by a DTE signal so that both of these two signals must be received by AND 84 in order to transfer data from Buffer 82 to Output Register 83.

After RECO Flip-Flop 86 has been set by the output from Flip-Flop 77, a signal is present on Line 87 which serves as an input lead to AND Gate 84. The output of AND 84 is coupled to Output Register 83, and therefore data is transferred from Data Output Buffer 82 to the Data Output Register 83 when a Data Transfer Signal (DTE) is applied to Input Line 88 of AND Gate 84. This signal is provided by a Data Transfer Shift Register 89, which is energized by a Box Detector 91. Accordingly, the final transfer of data into Output Register 83 is controlled by Box Detector 91.

Box Detector 91 can be a photoelectric cell, the light beam of which is broken by the container moving in front of the scanning apparatus. In such an operation, the light beam is re-established as the container completes its passage through the field of view of the scanning mechanism. Upon re-establishment of the beam, Box Detector 91 generates an output pulse which actuates Pulse Generator 92, which then generates a pulse. The pulse from Generator 92 is applied to Lead 93, which serves as an input lead to Data Transfer Shift Register 89 and Clear Control Flip-Flop 94. Data Transfer Shift Register 89 yields an output pulse on three Output Leads 88, 96, and 97. Clear Logic Flip-Flop 94 has an Output Lead 98.

Four events are sequentially initiated by the outputs of Data Transfer Shift Register 89 and Clear Control Flip-Flop 94 when Pulse Generator 92 yields an output pulse in response to the completion of the passage of the container through the field of view of Box Detector 91. (1) Clear Control Flip-Flop 94 generates a Clear All Logic signal which is utilized to clear all circuits within the data processing circuitry except Output Register 83. (2) Data Transfer Shift Register 89 generates a Clear Data Output Register (DOR) signal on Output Line 96 which serves as an input to Data Output Register 83. This signal therefore clears the data out of Output Register 83 in preparation for receiving new data. (3) Data Transfer Register 89 also generates a Data Transfer Enable (DTE) signal on Output Line 88. This signal serves as the second input to AND Gate 84, the output of which is also used as an input to Output Register 83. Accordingly, the presence of the output of AND 84 on the clock input of Register 83 effects the transfer of data from Register 83 to the output circuitry. (4) The signal on Output Terminal 97 of Data Transfer Register 89 serves as an input to Data Ready One-shot 101 so that the one-shot yields a signal to Output Terminal 102. This output signal is used to signal any peripheral equipment that data is available on the output terminals of Drivers 99.

Output Terminal 93 of Pulse Generator 92 is also connected to a Terminal 103 so that the output of Pulse Generator 92 also serves as a Box Ended signal. The Box Ended signal is coupled to one input of AND Gate 104. The other input of AND Gate 104 receives the Read Code (RECO) output present on Output Terminal 87 of RECO Flip-Flop 86 through an Inverter Circuit 107. The output generated by AND Gate 104 is coupled to No-Read One-Shot 108 to yield a No-Read output signal on Output Terminal 109.

The No-Read output of One-Shot 108 is used to indicate that a container has been scanned but the system has been unable to read a label on the container. This can occur because no label was present, because of excessive skew angle of a rectangular label, because of an excessively dirty label, or for any other reason a label could not be read. During normal operation of the system, Flip-Flop 86 does not generate an output until a valid scan is indicated at State 9. Accordingly, until State 9 is generated, there is a 0 logic pulse on Output Terminal 87. This 0 signal is inverted to a logic 1 condition by Inverter 107 so that an input signal is normally applied to AND Gate 104.

This logic 1 condition continues for all circumstances in which a label is not read, irrespective of the reasons that a label is not read. As a consequence, when the Box Ended signal is generated by Pulse Generator 92 AND Gate 104 is enabled and yields an output which sets No-Read One Shot 108 to yield the no-read output signal on Terminal 109. However, when RECO Flip-Flop 86 is set by Flip-Flop 77, a logic 1 pulse is applied to Inverter 107, which inverts the pulse to a logic 0 condition thus disenabling AND 104 and inhibitihg the generation of a Box Ended signal.

The operation of the entire system is dependent upon the passage of the container in front of the scanning mechanism, and therefore the detection of the container by Box Detector 91 is imperative to the operation of the system. The successful operation of the system is therefore dependent upon the reliable operation of Box Detector 91, as well as the proper functioning of the conveyer upon which the container is moving. The system therefore includes a conveyor-box detector failure indicating circuit which is useful in detecting several malfunctions of the system. The first malfunction is the possibility of the conveyer either inadvertently stopping because of a power failure or of running at too low a speed because of mechanical or electrical control problems. The second possibility of a failure is the failure of the box detector power supply so that the lamps within the box detector are not energized. A burned-out lamp in the box detector would also render the system inoperative. A broken or otherwise open cable from Box Detector 91 would also result in an inoperative system. Furthermore, Box Detector 91 includes a relay which is normally closed when a box or container is within the field of view of the detector. A relay which is jammed or otherwise will not operate therefore would render the system inoperative. The inventive system therefore includes a conveyor-box detector failure indicating system which is useful in detecting all of these failures.

The failure indicator system is shown in FIG. *3b* and includes a Set-Reset Flip-Flop 111, the Set input of which is coupled to the output of Box Detector 91. The output of Box Detector 91 is also coupled to a Decode Circuit 112. The output of Flip-Flop 111 is coupled to a timing circuit which includes a Pulse Generator 113 and a Counter 114. The output of Flip-Flop 111 also serves as an input to Decode Circuit 112. The output of Counter 114 is coupled by way of Line 116 to the Reset input of Flip-Flop 111.

In operation, when Box Detector 91 detects the presence of a box a relay is closed so that a logic 1 is generated which sets Flip-Flop 111. This actuates Pulse Generator 113 which generates a string of pulses which are injected into Counter 114. Counter 114 is set to receive a predetermined number of pulses which is dependent upon the lowest expected speed of the conveyor and the dimension of the largest box expected to be conveyed along the conveyor. If no system failure exists after the container completes its passage through the field of view of Box Detector 94, the box detector is shut off so that no signal is present to the Decode Circuit 112 which therefore deactuates Pulse Generator and Counter 114. The counter therefore is then cleared by the Clear All Logic Output of Clear Control Flip-Flop 94, and the system has operated properly. However, if a failure occurs, such as stopping of the conveyor with the box within the field of view of Detector 91, Counter 114 will count beyond the predetermined number and will actuate the Reset input of Flip-Flop 111. When this occurs there is no input to Decode Circuit 112 by way of Input Line 117. Accordingly, if at this point Decode 112 is still receiving an indication from Box Detector 91, an Alarm signal is generated by Decode Circuit 112. However, if a change has occurred so that there is no longer an input to Decode Circuit 112 from Box Detector 91, no Alarm signal is generated by the failure indicator circuitry.

A preferred embodiment of State Counter 51 shown in FIG. 4a is illustrated in FIG. 10. The state counter includes a series of AND Gates 121 through 130 which are sequentially actuated as the scanned information changes from one state of the label to the next. The state signals that are generated are pulses which are applied as state inputs to the appropriate logic elements throughout the logic circuit diagram shown in FIGS. *4a* and *4b* and fully described hereinabove.

The state counter can be considered as having an incrementing portion and a clearing portion. The function of the incrementing portion is the generation of pulses to advance the state counter to the next state. The sequence of events must be perfect or the system is cleared and the process started from the beginning. The function of the clear portion is the reinitialization of the state counter and the invalidation of the currently scanned data when state sequencing is not perfect.

In FIG. 10, AND Gate 121 receives three inputs which are State O, TD, and $DC \geqslant N_4$ (dark count equal to or greater than a preselected number $N_4$). A State 0 input is applied to Input Lead 131 of AND Gate 121 in all instances during which the container is being scanned but none of the other states is in existence. The TD input to AND 121 is received from the Sync Circuit 31 of FIG. *4a* and represents the reflective capability transitions from dark to light segments as described hereinabove with respect to FIG. *5c*. The $DC \geqslant N_4$ on Input Lead 148 is received from Dark Count Decoder 153 illustrated in FIG. 15.

Dark Count Decoder 153 receives the dark count pulses from Dark Bar Counter 42 of FIG. *4a* as illustrated by Leads 143 and 144. It should be noted that, in reality, more than two input leads are available to Dark Count Decoder 153 so that each specified dark count number will require a separate input line. Only two input leads are shown for convenience in illustration and description. The dark count number $N_4$ is selected so that the dark count exceeds a minimum dark bar width to thereby distinguish the dark periphery of the circular label from miscellaneous dark spots on the container or label. The number $N_4$ is therefore selected in accordance with a minimum allowable width for the label start segment.

In addition to a preselected count $N_4$, three other specified counts, $N_1$, $N_2$, and $N_3$ are utilized. $N_1$ represents the minimum width acceptable for one of the narrow segments of the pulse coded information. By using equal segments for the small coded segments and the State 1 and 5 segments, $N_1$ also represents these two states. $N_2$ represents the maximum width for the narrow segments of the coded pulse pairs, and $N_3$ represents the maximum width for the wide segments of the digital pulse pairs. $N_4$, as explained hereinabove, represents the minimum width for the wide dark segment which circumscribes the label and also the maximum selected width for State 4, which is defined by the center of the label. It should be noted that only four preselected pulse counts are required because State 0 and State 3, which are defined by narrow segments, are selected to have a segment width which is equal to the narrow segments of the pulse coded information. If this selection is not made, the State 1 and State 3 segments will have a lesser or greater number depending upon the relative width of these two segments with respect to the narrow segments of the digital pulse pairs. It should also be noted that $N_4$ is used as the label initiation count as well as the label termination count. This also can be changed and different numbers used for these two counts if so desired. However, any of these changes adds some complexity to Light Count Decoder 152 and Dark Count Decoder 153.

When the three inputs, State 0, TD, and $DC \geq N_4$ are simultaneously present at the inputs to AND Gate 121, the AND Gate generates an output pulse which is applied to an OR Gate 154 over Lead 156. The pulse from AND Gate 121 causes OR Gate 154 to generate an INCREMENT output pulse which is applied to State Change Counter 157. Counter 157 then generates an output pulse which is applied to State Decoder 158 so that Decoder 158 increments one step and changes from State 0 to State 1, and hence an output is present on Output Lead 132. The State 1 output is applied to AND Gate 122 as illustrated by the identical number of Lead 132.

The TL output signals of Synchronization Circuit 131 of FIG. 4*a* are applied to one of the input leads of AND Gate 122 and the $N_1 \leq LC \leq N_2$ is applied to Input Lead 147 of AND Gate 122. The light count is received from Light Count Decoder 152 (FIG. 15), which in turn receives inputs from Light Bar Counter 37 of FIG. 4*a* over Input Leads 141 and 142.

When a valid label is being scanned, and the system has been incremented to Step 1 by Decoder 158, the presence of a TL pulse and the scanning of the light, narrow segment identified as State 1 in FIG. 1 causes the generation of the proper $LC$ signal which is input to AND Gate 122. The simultaneous presence of these inputs to AND Gate 122 causes it to generate an output pulse which is applied to OR Gate 154 over Lead 159. The input to OR Gate 154 from AND Gate 122 causes the OR Gate to yield an INCREMENT pulse output which is applied to Decoder 158 through State Change Counter 157 so that the decoder increments from State 1 to State 2.

The output pulse of AND Gate 122 applied to Output Lead 159 is also applied to an AND Gate 161 through an Inverter 162. AND Gate 161 also receives the State 1 input from Decoder 158 and the TL signal from Sync Circuit 131. When a State 1 input is available to AND Gate 161, and a pulse output is received from AND Gate 122, the pulse available from AND Gate 122 is inverted to a 0 input by Inverter 162 so that AND Gate 161 is deactuated. However, if a State 1 signal is available to both AND Gates 122 and AND Gates 161 and the proper $LC$ signal is not available to AND 122, a 0 logic condition is present on Output Terminal 159 of AND 122. This is inverted to a 1 by Inverter 162 so that AND 161 is actuated and generates an output pulse on Terminal 163 when the TL signal is asserted. This pulse is applied to OR gate 164 which then supplies a pulse to OR Gate 166. The output of OR Gate 166 is used as a CLEAR output pulse which is applied to State Change Counter 157 to actuate State Decoder 158 and return it to the State 0 condition. As a consequence, if the logic circuit improperly reached the State 1 condition because of spurious signals occasioned by spots or dirt on the container or label and the correct light count is not received by AND 122, erroneous readings are avoided.

The State 2 from State Decoder 158 is applied by Input 133 to AND Gate 123 which also receives the TL signal from Sync Circuit 31 and a label (LAB) signal generated in a manner described hereinafter with respect to FIG. 11.

As illustrated in FIG. 1, State 2 is the coded information state, and therefore it is necessary to read eleven bits of data before incrementing Decoder 58 from State 2 to State 3. This is accomplished by use of the LAB signal which is generated as shown in FIG. 11.

In FIG. 11, AND Gate 167 receives the TL pulse outputs from Sync Circuit 31 as well as a State 2 input from Decoder 158. The output of AND 167 is coupled to an OR Gate 168, the output of which is coupled to an 11-bit Counter 169. As a consequence, each transition of the received information from the dark to the light condition causes the generation of an output pulse by AND 167, provided each bit of pulse code information is within prescribed limits as indicated hereinabove. This pulse is applied to Counter 169 through OR Gate 168. After eleven bits have been counted by Counter 169, LAB Flip-Flop 171 is set and generates the LAB signal which is applied to AND Gate 123 of FIG. 10. The LAB signal is also applied to the Reset input of Flip-Flop 171 to thereby reset the flip-flop on the next clock pulse and prepare it for the next input from Counter 169.

Referring again to FIG. 10, upon the generation of the LAB signal by Flip-Flop 171, AND Gate 123 generates an output which is applied by way of Line 173 to OR Gate 154 to effect incrementation of Decoder 158 from Step 2 to Step 3.

The incrementation of Decoder 158 to State 3 applies an input to Input Terminal 134 of AND Gate 124. This AND Gate also receives a TD pulse and is $N_1 \leq DC \leq N_2$. The dark count input is received from Dark Count Decoder 153. Accordingly, when the dark count received by Dark Count Decoder 153 is between the two selected values $N_1$ and $N_2$, AND Gate 124 yields an output pulse on Terminal 174 which is applied to OR Gate 154 to effect incrementation of Decoder 158 to State 4.

The State 4 signal is applied to Input Terminal 135 of AND Gate 125, which also receives a TL signal and an $N_2 \leq LC \leq N_3$ signal. Reference to FIG. 1 shows that State 4 is defined by the center of the label. The two counts $N_2$ and $N_3$ are therefore selected so that $N_3$ is representative of a chord of the center of the label, which is a maximum length of the diameter. $N_2$ is selected to represent a chord which is a substantial portion of the diameter of the label such as 50 percent or 60 percent. This is done so that a scan of the label which passes through only a very small chord of the center of the label rēsults in a no-read output. This is accomplished because the output of AND 125 is connected to AND Gate 176 via Output Lead 177 and Inverter 178. Thus, if the $N_2 \leq LC \leq N_3$ signal is not present because the scan count is outside of one of the limits, AND 176 yields an output which recycles State Decocer 158 to State 0 in the same manner as explained hereinabove with respect to AND 161.

It should also be noted that the tolerances of $N_2$ and $N_3$ are selected so that a scan through the label such as the Scan 179 shown in FIG. 1 is not confused with a valid center reading.

When the correct signals are received by AND 121, it also causes the incrementation of Decoder 158 through OR Gate 154 and State Change Counter 157 to thereby increment Decoder 158 to State 5. State 5 is shown in FIG. 1 to be the second scan of the narrow segment which separates the center of the label from the coded segments. Accordingly, a valid input to AND Gate 126 requires a simultaneous input of the State 5 signal, a TD signal, and $N_1 \leq DC \leq N_2$ signal. It should be noted that the requirement for the proper dark count input to AND Gate 126 is also instrumental in preventing incrementation of Decoder 158 in those instances in which a scan such as 179 shown in FIG. 1 passes through a light segment along a scan length accidentally falling within the selected Light Counts $N_2$ and $N_3$. Without the requirement for State 5 immediately following a light count between the values of $N_2$ and $N_3$, a scan such as 179 shown in FIG. 1 falling within the $N_2$ and $N_3$ range could inaccurately be interpreted as a valid State 4 and cause incrementation of the system to the coded information state. However, because State 5 is required, an improper incrementation from State 4 will not result in an invalid reading because the failure of the $N_1 \leq DC \leq N_2$ signal causes AND 182 to clear Decoder 158.

Upon incrementation of Decoder 158 to State 5, AND Gate 126 is actuated by the presence of a State 5 signal, a $\overline{TD}$ signal and an $N_1 \leq DC \leq N_2$ signal. The simultaneous presence of these signals to AND 126 results in incrementation of State Decoder 158 to State 6.

Upon incrementation of Decoder 158 to State 6, which is shown in FIG. 1 to represent the coded information occurring on the second half of the circular label, AND Gate 127 is used to control the increment inputs to Decoder 158. For this reason, AND Gate 127 receives the State 6 input as well as the TD and label inputs in much the same manner as AND Gate 123 controls the circuitry when the first half of the label is being scanned. The Lab signal received by AND Gate 127 is also generated in the manner illustrated in FIG. 11. In FIG. 11 an AND Gate 172 receives a TD signal from Sync Circuit 31 and also the State 6 input applied to Terminal 137 by Decoder 158. The output of AND Gate 172 is fed to OR gate 168 which actuates Bit Counter 169 in the same manner as described hereinabove with respect to the first half of the label. Accordingly, after the 11 bits of coded information are received during State 6, the LAB signal is generated to effect incrementation of Decoder 158 to State 7.

The State 7 pulse generated by Decoder 158 during the State 7 condition is applied to Input Terminal 138 of an AND Gate 128. This AND gate also receives a TL signal and an $N_1 \leq LC \leq N_2$ signal. In this instance, the $N_1$ and $N_2$ values are used as constraints upon the width of the last light segment on the label. This is the segment which is shown in FIG. 1 as separating the coded information segments from the wide dark segment and representing State 7. As soon as all the appropriate signals are applied to the inputs of AND 128, an output pulse is present on Output Terminal 186 to increment Decoder 158 through OR Gate 154 and State Counter 157 to State 8. It will be noted that the output of AND Gate 128 also is directed to an AND Gate 187 through Inverter 188. Inverter 188 and AND Gate 187 operate as described hereinabove to generate a CLEAR signal when one of the required input signals to AND Gate 128 fails to appear during the existence of the State 7 signal.

After being incremented to State 8, Decoder 57 applies a State 8 input to Input Terminal 139 of AND Gate 129. AND Gate 129 also receives a TD pulse and a $DC \geq N_4$ which, as described hereinabove, represents the maximum allowable width for the dark segment which circumscribes the label. Accordingly, after a valid count from State 8 is present on Input Terminal 148 of AND Gate 129 an output pulse on Output Terminal 189 actuates OR Gate 154 to result in the incrementation of Decoder 158 to State 9.

State 9 is the last state defined by the label and thus the system is incremented to State 0 to prepare the system for the next label. The first clock pulse occurring subsequent to the advance of State Decoder 158 to State 9 actuates AND Gate 130 which generates a pulse which is propagated through OR Gate 154. This pulse is used to increment Decoder 158 so that it returns to State 0, thus preparing the State Counter 51 to receive information during the next scan of the label.

FIG. 10 includes a NAND Gate 192 which applies an input to AND Gate 193, as well as another NAND Gate 194 which applies an input to an AND Gate 196. NAND Gates 192 and 194 operate in like manner in that they receive sum signals from Test Comparator 49 of FIG. 4a. As described hereinabove, Test Comparator 49 compares the total number of pulses received from Light Count Buffer 44 and Dark Count Buffer 47 for each pair of data bits and verifies that the total count is above a minimum count and below an upper count. The upper limit (UL) and lower limit (LL) comparison signals are applied to NAND Gates 192 and 194 over Output Terminals 52 and 53 of Comparator 49. These terminals are also indicated as input terminals to NAND Gates 192 and 194. Because of the operation of the NAND Gates, when both the upper and lower limit signals (UL and LL) are present, no output is generated by either of the NAND gates. However, if either of the required limits is not met a 0 is present on one of the input terminals to the NAND gates, each NAND gate then generates an output signal. The output pulses of NAND Gates 192 and 194 are applied to AND Gates 193 and 196. Accordingly, a State 2 signal on the other input terminal of AND 193, or a State 6 signal on the second input terminal of AND 196, results in the generation of an output pulse which resets State Decoder 158 through OR Gate 166 and State Change Counter 157.

The operation of State Counter 51 is such that only one of AND Gates 121 through 130 can be actuated at a given instant. This is so because only one of the States 0 to 9 defined by the label segments is in existence at a given instant, and each AND Gate receives an input representative of a different state. Furthermore, because each of AND Gates 121 to 130 receives either a TD or a TL signal, the changes in state can occur only at the transitions between the dark and light segments of the label. For this reason, it is impossible to increment State Decoder 158 at any time other than during the transition between segments. This is important because it prevents any pulse count exceeding the preselected numbers applied the AND gate actuating the AND gate and thus incrementing Decoder 158. Furthermore, because each AND gate requires a particular dark or light count input before incrementation can occur, signals received from dirt spots, printing, and other extraneous matter on the label or container is ineffective to cause incrementation of Decoder 158. This is important because, even in those rare instances where the extraneous spot may fall within the given dimensional requirements, and thus result in the actuation of one of the AND gates, it is highly unlikely that the appropriate state and scanning number would follow the extraneous spot, and therefore a CLEAR signal would be generated to return the Decoder 158 to State 0.

The state counter shown in FIG. 10 is described as being useful with a circular label of the type shown in FIG. 1. However, it should be appreciated that, as described hereinabove, if two of the rectangular labels illustrated in FIG. 2 are applied to the container in reverse order, so that the second label has the wide white bar at the top, State 4 can be defined as the combination of the white segment present on each of the two labels so that the state counter described with respect to FIG. 10 can also be used with two rectangular labels.

FIG. 8 shows the logic circuitry which can be used on a plurality of rectangular labels of the type illustrated in FIG. 3 are used on the container. It should be noted that FIG. 8 is only a portion of the logic circuitry and that a substantial portion of the logic circuitry shown in FIG. 4*a* is included in the logic circuitry for the rectangular label. Furthermore, the State Counter 201, Label Counter 219, and Label Count Decoder 239 shown in FIG. 17 are used with the embodiment of FIG. 8. The similarity of the logic circuitry is illustrated by the use of similar reference numbers for similar parts and particularly by identically numbered leads in the several figures. That is, State Counter 201 of FIG. 17 is shown receiving Input leads 141, 142, 143, 144, 52, and 53. Reference to FIG. 4*a* shows that Leads 141 and 142 are connected to the output terminals of Light Bar Counter 37, that Leads 143 and 144 are connected to the output terminals of Dark Bar Counter 44 and that Leads 52 and 53 are connected to the output terminals of Period Test Comparator 49. It should also be appreciated that Bit Comparator 54 of FIG. 8 is identical to Bit Comparator 54 of FIG. 4*a* so that the Input Terminals 56, 57, 58, and 59 are connected to the Light Count Buffer 44 and Dark Count Buffer 47 identically in both logic circuits. Accordingly, the complete logic circuit for reading a plurality of rectangular labels can be obtained simply by connecting the FIG. 8 and 17 terminals identified above to the identically numbered terminals of FIG. 4*a*.

The major differences between the logic circuitry for the circular and rectangular labels occurs in the state counter. Accordingly, State Counter 201 of FIG. 17 is described in detail hereinafter with respect to FIG. 9.

Bit Assembly Register 202 of FIG. 8 is very similar to Bit Assembly Register 63 of FIG. 4*a*. However, it should be noted that Assembly Register 202 is actuated to shift right or left through AND Gates 203 and 204, respectively, depending upon the orientation of the label from which the data is received. Accordingly, AND Gate 203 is actuated when the label being scanned has the wide white segment at the top while AND Gate 204 is actuated when a label having the black wide segment at the top is being scanned. For this reason, the input signal to AND Gate 203 is identified as WWIB, which represents White Wide Initialize Bar, and AND Gate 204 receives a signal identified as BWIB, which stands for Balck Wide Initialize Bar. With this exception, and the different bit count required for the two registers, the operation of Bit Assembly Register 202 of FIG. 8 is identical to that of Assembly Register 63 is actuated from the right or left, depending upon which half of the circular label is being scanned.

Label Code Storage Circuit 71 and Label Code Comparator 72 of FIGS. 8 and 4*b* are also identical except for different numbers of bits. The output of Label Code Comparator 72 is directed at an AND Gate 206 which receives a State 3 input as well as a TD or TL input through an OR Gate 207. This actuates an increment Counter 74 which is identical to Increment Counter 74, FIG. 4*b*. The output of Increment Counter 74 actuates an 8-Bit Shift Register 208 as well as the Set Input of SR Flip-Flop 77. 8-Bit Shift REgister 208 operates identically to 11-Bit Shift Register 76 of FIG. 4*a*, but is a different bit count because there is a different number of coded pulse segments on the rectangular label from the circular label. However, the capacity of Shift Register 208 will be dependent upon the number of dititial pulse spaces coded upon the label and therefore could change from label to label and from system to system. When SR Flip-Flop 77 is in the SET position it generates an SR output which actuates AND Gate 209 to actuate the LOGIC system in the same manner described with respect to FIG. 4*b*. However, the output of AND Gate 209 is directed to a series of AND Gates 211, 212, and 213, so that the data is shifted to the utilization circuit through data Output Buffer 214 and Data Output Register 216. As will be described hereinafter, there is an AND Gate, a Data Output Buffer and a Data Output Register for each label which is to be read. Accordingly, any number of labels can be read simply by setting the desired number into the logic system. This is fully described hereinafter. Also, because there is an AND gate and Output Buffer for each label, the data from each label is automatically separated. AND Gate 213 is shown receiving a LAB *n* input to indicate that any number n of labels can be read.

FIG. 17 shows a label Counter 219 and Label Count Select switches 221 to 223, which are used to select the number of labels to be scanned on the container. Accordingly, the number of labels read can be varied between from one to a predetermined maximum by using the appropriate number of Count Select Switches and providing the maximum number of Output Buffers and Output Registers. The number of labels to be scanned is selected by setting Switches 221, 222, and 223, which schematically represent the capability of setting the switches so that any number of labels between 1 and 7 can be read. The proper setting of these switches therefore places either 0 or 1 output signals on Lines 224, 226, and 227, so that the LN0, LN1, and LN2 signals are either Logic 1's or 0's and are logically combined to any number from 1 to 7.

Label Counter 219 also receives inputs through a series of AND Gates 228, 229, 231, and 232. Before describing the operation of these AND Gates, the definitions of the signals which actuate them are as follows:

*MSLF* = Most Significant Label First
*MSLL* = Most Significant Label Last
*SOB* = Start of Box Signal, received from Circuit 90 of FIG. 4*b*
*SR* = Output received from SR Flip-Flop 77
*BWIB* = Black Wide Initialize Bar
*WWIB* = White Wide Initialize Bar The identification of these signals can be understood by reference to FIG. 13, which shows three labels arranged on a container moving in the direction indicated by Arrow 233. The label on the right is identified LSL, which indicates it is the Least Significant Label, and the label on the left MSL, which indicates the Most Significant Label. Because of the direction of motion from left to right, as indicated by Arrow 233, the least significant label will be read first. The labels must be identified as most and least significant to prevent reversing the data they carry. It is therefore necessary fot the logic circuitry to "know" whether the most significant or the least significant label is being read first so that the correct Output Register receives the data from the correct label, irrespective of the direction of motion.

The Black Wide Initialize Bar (BWIB) and White Wide Initialize Bar (WWIB) signals are used because adjacent labels are reversed. This is shown in FIG. 13, where the labels on the extremeties have the wide dark segment at the top and thus a *BWIB* signal is required, while the center label has a white bar at the top and thus a *WWIB* signal is required. The *BWIB* and *WWIB* signals control direction that data is received by Bit Assembly Register 202 so that data from all labels is received in the same order, irrespective of the orientation of the label. For example, if the center label of FIG. 13 carries the number 61, it is scanned as 16. However, because *WWIB* is used, the Output Register receives the data as 61. The *BWIB* and *WWIB* signals are also used by the state counter for sequencing changes required by different label orientation.

The output signals of Label Code Counter 219 are identified as CA, CB, CC, and CD. These signals are injected into Label Count Decoder 239 where they are combined to yield an output representative of the number of labels to be counted and to actuate the counter so that the input data is directed to the proper data output Buffer 214. The output of Label Count Decoder 239 is also directed to a Label Count Validation Circuit 241 which validates the count of labels and which generates the *BWIB* and *WWIB* outputs. The *BWIB* and *WWIB* signals are easily generated because of *BWIB* always being used first and *WWIB* second. Accordingly, the *BWIB* and *WWIB* signals are alternately generated as the CA, CB, CC, and CD inputs to Label Count Decoder 239 changed as the completion of label scans occur.

The Most Significant Label First (MSLF) and the Most Significant Label Last (MSLL) signals are generated in the Box Direction Circuit 240 schematically to include a Battery 242 coupled to a Switch 243. When Switch 243 is in one position the battery potential is used and a *MSLF* signal used. When the position of Switch 243 is reversed, the potential is used as the *MSLL* signal. Obviously, Box Direction Circuit 240 is shown simplified and more sophisticated systems can be used.

In operation, the position of Switch 243 is set in accordance with the direction of movement of the container carrying the labels with respect to the scanning mechanism. Accordingly, the *MSLF* or *MSLL* signal is applied to the appropriate AND gates which serve as inputs to Label Counter 219. Assuming the *MSLF* is being used, AND Gates 229 and 231 both receive this signal. AND Gate 229 also receives the Start of Box (SOB) signal so that the output of AND 229 clears Counter 219 from all previous counts. As soon as the SR signal is received by AND Gate 231, a signal is applied to the Up Count Input of Label Counter 219 so that the count proceeds upwardly from the cleared 0 condition. When the appropriate count is received by Label Counter 219, the CA, CB, CC, and CD signals are generated and input to Label Count Decoder 239 which is incremented to change its output from Label 0 (LAB0) to Label 1 (LAB1). When the SR signal is removed because of a complete scan count of Eight-Bit Shift Register 208, AND Gate 231 is inactive. The operation is then repeated to increment Decoder 239 from LAB1 to LAB2, etc., in accordance with the selection of Switches 221, 222, and 223.

Assuming that the container motion direction is such that the most significant label is read last, the MSLL signal is applied to AND Gates 228 and 232. AND Gate 228 also receives the Start of Box signal and, accordingly, generates a preset input to Label Counter 219. The preset input then causes a preselected number of pulse counts, depending upon the number of labels to be read to be set into the counter. Subsequently, when AND Gate 232 receives an SR signal from SR Flip-Flop 77, Label Counter 219 counts downwardly, generating output signals which decrement Label Count Decoder 239 downwardly from the highest numbered label to the lowest numbered label to thus actuate the proper Data Output Buffer and Data Output Register.

Label Count Validation Circuit 241 receives the CA, CB, CC, and CD outputs of Label Counter 219, the LNO, LN1 and LN2 outputs from Selector Switches 221, 222, and 223, and also the MSLF and MSLL signals. Label Count Validation Circuit 241 is also actuated by the Total Count output of Label Count Decoder 239. Accordingly, after the correct number of labels has been successfully read, Label Count Validation Circuit 241 generates a READ CODE signal which is used to allow the data assembled in Data Output Buffers 214, and 217, etc., to be transferred into the Data Output Registers and pass to the utilization network.

Label Count Validation Circuit also generates the *BWIB* and *WWIB* signals as the Total Count from each label counted is generated in accordance with the incrementation of Label Count Decoder 239.

The LAB 1–7 outputs from Label Count Decoder 239 are applied to the appropriate data output buffer through AND gates which also receive the S DATA output of Label Code Storage 271 and the output of AND 209 so that the data received from the various labels is separated and appropriately passed to the utilization system through the Output Buffers.

As an example, AND Gate 211 which actuates Data Output Buffer 214 receives the LAB1 signal, the S-DATA signal from Label Code Storage Circuit 71, and the output of AND Gate 209. Therefore, although AND Gates 212 and 213 also receive the S-DATA and output of AND 209 only AND 211 is active, because the other AND's do not receive the LAB1 input. Accordingly, at the completion of a full scan of Label 1 Data Output Buffer 214 receives the data from the valid scan. It should be noted that Output Buffer 214 ultimately actuates the Data Output Register 216, the output of which represents the most significant label read on the container. In similar fashion, AND Gate 212 receives the output of AND Gate 209 as well as the S-DATA pulse from Label Code Storage 71 and the LAB5 signal. Accordingly, when Label 5 is being scanned, AND 212 is actuated and Data Output Buffer 217 receives the data resulting from the coded information on the fifth label being read. AND Gate 213 operates identically with AND Gates 211 and 212 for the $n^{th}$ label as indicated by LABn input signal, where $n$ represents the highest label to be read on the container. It will be noted that all other labels will be read by the use of an AND gate, a Data Output Buffer and a Data Output Register in the same manner as indicated for the other labels. This is indicated by the broken lead lines numbered 244. It therefore should be understood that each of the lead lines indicated as 244 would be connected to an appropriate AND gate which would receive the S-DATA input, AND input 209, and a LAB input to ultimately actuate a data output buffer and a data output register.

The similarities between the logic circuits shown in FIGS. 4 and 8 are quite substantial with the primary differences being in the provision of the label counter in the FIG. 8 embodiment so that a plurality of labels can be read. Accordingly, because of these substantial similarities, it should be readily evident to those skilled in the art that a plurality of circular labels can also be read by utilizing the label counter techniques employed in the FIG. 8 embodiment and also by utilizing a plurality of Data Output Buffers and Data Output Registers.

In describing the reading of a plurality of labels, reference is made to FIG. 13 which shows three rectangular labels shown horizontally spaced and substantially horizontally aligned. It is evident from the discussion of the logic circuit that the horizontal alignment of the labels is not required. It is, therefore, possible to locate the various labels at any convenient locations on the container. The only qualifications are that the labels must alternate so that the dark segments and light segments on adjacent labels are opposite one another. Furthermore, the labels should be horizontally spaced so that a complete label is scanned before the scanning of the next label begins. This is required in order to effect the appropriate switching from the various states of the labels without confusing logic circuitry. Details of the state transitions are described herein with respect to FIG. 9.

The use of Label Counter 219, Label Count Selector Switch 221, and Label Count Decoder 239 improves the reliability of the system because the generation of the LAB0 to LAB7 signals is dependent upon the scanning of the selected number of labels. Hence, if a label falls off, or is mutilated and cannot be read, a No-Read indication is given.

Also, because rectangular labels are alternately arranged, the *BWIB* and *WWIB* signals serve to prevent incorrect readings if a container is scanned upside down. Provision can be made to read upside-down containers by reversing the roles of the BWIB and WWIB signals.

A plurality of circular labels can be read by employing the logic circuit shown in FIG. 8. When this is done, the orientation or location of the various labels can also be random on the container. However, the labels must be arranged so that the centers of two labels are not scanned on the same pass. It is, therefore, possible to arrange the labels such that two labels are scanned. However, it is essential that this does not occur while the centers of the labels are being scanned. Furthermore, it is preferable that while the center of one label is being scanned no portion of the other label is scanned. It is, therefore, permissible to overlap the labels a distance which is just less than the radius of the label. The difference in the overlap radius of the labels will be the radius of the center spots so that when the center of a label is being scanned no portion of another label is being scanned.

Because the circular labels have radial symmetry, all labels will be initiated on a *BWIB* signal. Accordingly, when a plurality of circular labels are used, it is necessary to obtain separation of the label data by some means other than the *BWIB* and *WWIB* signals. This can be done by a timing sequence or, alternatively, by appropriate physical label spacing, or in other modes apparent to those skilled in the art.

The details of a preferred embodiment of a State Counter 201 are shown in FIG. 9. This state counter also can be considered as having an incrementation function and clear function, the same as the state counter described with respect to FIG. 10. State Counter 201 also employs the Light Count Decoder 152 and the Dark Counter Decoder 153 shown in FIG. 15, which respectively receive the outputs of Light Count Buffer 44 and Dark Count Buffer 47. Light Count Decoder 152 generates an output $LC > N_3$, which indicates that the light count is greater than a preselected minimum value $N_3$, with $N_3$ representing the preferred width of the wide white segment on the rectangular label. Light Count Decoder 152 also generates an $N_1 < LC < N_2$ signal, where $N_1$ defines the minimum permissible value for the narrow data segments and $N_2$ defines the maximum allowable width for the narrow data segments. Dark Count Decoder 153 operates similarly to Light Count Decoder 152 but its outputs represent the dark segment counts falling within the selected values of $N_1$, $N_2$, and $N_3$. These light and dark count output signals from Light Count Decoder 152 and Dark Count Decoder 153 are applied to the appropriate AND Gates 248 through 255 as shown in the figure. AND Gates 248 through 255 also receive either the *BWIB* or *WWIB* signals to ultimately result in the generation of increment signals to increment State Decoder 267 through a State Change Counter 266. As an example, assume the first label on a container being scanned will have a black bar at the top, and accordingly a BWIB signal will be generated by Label Count Validation Circuit 241 shown in FIG. 8. The *BWIB* signal is applied to one input of AND Gate 248 and after a signal is generated by Dark Count Decoder 247 which indicates that the dark count is greater than $N_3$ ($DC > N_3$) both input terminals of AND 248 are actuated so that AND 248 applies an input to OR Gate 256. The output of OR 256 is applied to another AND Gate 261, which also receives a State 0 output from State Decoder 267, shown in FIG. 16. When the two signals are simultaneously applied to the input terminals of AND 261, OR Gate 268 is actuated and then generates an INCREMENT signal which is applied to State Change Counter 266 (FIG. 16). The output of State Change Counter 266 increments State Decoder 267 from State 0 to State 1.

The *BWIB* signal continues for the entire scanning period of the label and, accordingly, this signal is simultaneously applied to AND Gates 250, 252, and 254. When thecount (LC) from the narrow white segment defining State 1 is received and is between the values $N_1$ and $N_2$ both input terminals of AND 250 are actuated so that a signal is applied to OR Gate 257. The output of OR Gate 257 is applied to AND Gate 262. The State 1 signal is present on AND 262 so that an output which actuates OR Gate 268 results, thereby generating an INCREMENT signal which is applied to State Counter 266. State Change Counter 266 then increments State Decoder 267 from State 1 to State 2.

The output of OR Gate 257 is also applied to an AND Gate 269 through an Inverter 271. Accordingly, the logic 1 output of OR Gate 257 is inverted to a logic 0 which is applied to the input of AND 269, so that AND 269 remains unactuated. However, if the output from OR 257 is logic 0, this is inverted to a logic 1 which then actuates one input terminal AND 269. As a consequence, if the output of AND 250 goes to logic 0 during the existence of State 1, AND Gate 269 generates an output pulse which is applied to OR Gate 272 which generates a CLEAR signal. The CLEAR signal is applied to State Change Counter 266 so that State Decoder 267 is cleared and returned to a State 0 condition. When State Decoder 267 is incremented to State 2 this signal is applied to AND Gate 263. AND Gate 263 receives an LAB signal which is generated in the manner described with respect to FIG. 11 hereinabove so that AND 263 yields an output pulse to actuate OR Gate 268, resulting in the incrementation of State Decoder 267 to State 3 at the end of the coded information.

It should be noted that AND Gates 261 through 265 and 269, 277, 272, and 274 of FIG. 9 should also have TL and TD pulses applied to their inputs in the manner described for the circular label state counter. However, they have been left off for clarity.

FIG. 2 shows that State 3 is represented by the narrow dark segment which immediately follows the coded information. The limits of the dark count are constrained to be between $N_1$ and $N_2$. The $N_1 \leq DC \leq N_2$ signal is applied to one input of AND Gate 252 which also receives the $\overline{BWIB}$ count to actuate an OR Gate 258. The output of OR 258 is applied to one input terminal of AND Gate 264 and the other input terminal of AND 264 receives a State 3 input so that a pulse is generated and applied to OR 268, resulting in the incrementation of State Decoder 267 from State 3 to State 4. It should be noted that the output of OR 258 is applied to an AND Gate 272 through an Inverter 273 which operate in the same manner as AND Gate 269 and Inverter 271 to produce CLEAR signals when proper scanning does not occur. Upon incrementation from State 3 to State 4 the appropriate BWIB and ark inputs are applied to AND Gate 254, which results in the incrementation of State Decoder 267 through AND Gate 265 and OR Gate 268. The output of OR Gate 259 is also applied to an AND Gate 274 through Inverter 276 with these elements operating identically with AND Gates 269 and 271 to generate a CLEAR signal when the count is wrong.

It will be noted that in the above description of State Counter 201 all the AND gates receive the $\overline{BWIB}$ signal. The same type of operation occurs when a label is read which has the wide white segment at the top. However, in this case a WWIB signal is applied to AND Gates 249, 251, 253, and 255 which operate to either actuate AND Gates 261 through 265 and thus increment State Decoder 267 or to produce CLEAR signals.

FIG. 9 also includes an AND Gate 277 which supplies an input to CLEAR signal generating OR Gate 272. AND Gate 277 receives the State 2 input which is available when the coded information is being received. The other input of AND 277 is connected to the output terminal of a NAND Gate 278, the input terminals of which are connected to Output Terminals 52 and 53 of Period Test Comparator 49. Accordingly, if the total count of the pulses received during a coded pulse segment does not fall between a minimum and a maximum value, NAND Gate 278 generates a positive output pulse and AND Gate 277 is then actuated so that a CLEAR signal is generated by OR Gate 272. This signal clears State Decoder 267 through State Change Counter 266 to return State Decoder 267 to the State 0 condition.

The manner of controlling Light Bar Counter 37 and Dark Bar Counter 42 (FIG. 4*a a*) through AND Gates 36 and 38, respectively, clearly shows that all counts utilized throughout the processing circuitry are dependent upon the clock (CLK) input received from Clock Oscillator 32. For this reason, if some physical phenomena occurs which causes the data segments to apparently change widths or if the scan rate across the segments apparently changes the dark and light counts will change. One manner in which this phenomena can occur is illustrated with respect to FIG. 14. In FIG. 14 Scanning Prism 11 is shown positioned at a horizontal scanning distance D from the Object 22. In this position, the width W of a segment on the normal is determined by the actual width of the segments on the label and thus a particular count rate represents each segment width for a given rotational velocity of Prism 11 for the time the segment is being scanned. The scanning speed $V_s$ across a segment label is determined by the expression $V_s = \omega D$, where $\omega$ is the rate of change of the angle $\theta$ and $D$ is the distance between the reflecting surface of Prism 11 and the object. Accordingly, the scan rate $V_s$ across a segment appears to increase as the angle $\theta$ increases. This is so because the linear velocity $V_s$ is always perpendicular to the vector connecting the scanner and the object, as illustrated in FIG. 14. The scan angle also changes the distance $D$ to the label because it is equal to $D/\cos\theta$. Furthermore, the apparent width of the segments changes from $W$ to $W'$ in accordance with the changes in the scan angle $\theta$. The pulse count received from a given segment would therefore vary as the angle $\theta$ varies. The count for any label bar width will be proportional to the time the laser spot takes to move across it.

$$C = K\, t_B$$

where:

$K$ = conversion constant associated with the clock rate $C$ = count $t_B$ = time for spot to cross bar For a bar normal to the scan axis the time $t_B$ is inversely proportional to the scan velocity.

$$t_B = W/V_s = W/(\omega D)$$

where:

$W$ = bar width $D$ = distance to target $\omega$ = angular scan rate

At angle $\theta$ the scan velocity will increase by:

$$V_s = (D/\cos\theta)\,\omega$$

the apparent bar width decreases by:

$$W' = W\cos\theta$$

therefore, the count decreases at angle $\theta$ to $$C = (KW \cos \theta)/(D\omega/\cos \theta) = (KDW)/(\omega)\ (\cos \theta)^2$$

In order to compensate for this change, the clock rate is varied as a function of scan angle. That is, the constant $K$ is varied by $K'/(\cos \theta)^2$ so the new count becomes $$C = [K'/(\cos \theta)^2]\ (W/\omega)\ (\cos \theta)^2 = (K'W)/\omega$$

Thus, the count becomes independent of scan angle for perfect compensation.

A technique for varying the clock rate as a function of scan angle is shown in FIG. 12 which includes a Function Generator 281 which receives a Start Scan input. The Start Scan input synchronizes the output of the Function Generator 281 with the scan angle and thus can be a signal generated by use of a photocell in the laser path. The output of Function Generator 281 is a signal which varies in accordance with the expression:

$$V_o = V_n\ [K_1 + (K_2)/(\cos \theta)^2]$$

where:

$K_1$ and $K_2$ are constants.

In this expression $\theta$ is constrained to a particular angular excursion, such as ± 30°. This compensates for the apparent bar width change in accordance with the expression hereinabove. Accordingly, the frequency of the output of Voltage Controlled Oscillator 282 is dependent upon the cos $\theta$, illustrated in FIG. 14. Because $\theta$ is dependent upon the distance D, the frequency output of Voltage Control Oscillator 282 is a function of distance $D$.

The output of Voltage Control Oscillator 282 is then applied to the Clock Generator 283. The output pulse rate of Generator 283 is dependent upon the frequency of Oscillator 282 and the frequency of Oscillator 282 is dependent on the voltage changes of Generator 281, so that the rep-rate of Clock 283 is varied in accordance with the scan angle $\theta$.

The distance function required for changing the pulse period (T) of Clock Generator 283 in accordance with the distance $D$ is set into Clock Generator 283 by way of the Selector Switch 284. This input changes the where, frequency output of the Clock Generator as a function of distance $D$ in accordance with the distance settings indicated on the various contacts of Switch 284. The repetition rate, and hence the period $T$ of Clock Generator 283 is thus changed by Function Generator 281 and Selector Switch 284. By utilizing a clock oscillator controlled in the manner indicated with respect to FIG. 12, bar width variation of scan angle is minimized by controlling the rep-rate of the clock signal in accordance with the scan angle $\theta$. This is also indicated in FIG. 12 wbere, at zero degrees, the width $T$ of a digital pulse pair indicated as $N$ while at the extreme scan angles of ±30°, $T = \frac{3}{4} N$ seconds. It should be understood that scan angle compensation is achieved by replacing Clock Oscillator 32 of FIG. 4*a* with Generator 283 of FIG. 12 and its controlling elements. The pinrciples are equally applicable for labels of all configurations.

What is claimed is:

1. A system for processing received data encoded on a reflective label having reflective segments of preselected width and reflective capabilities to define active states comprising:

means for receiving said data and generating clock pulses in synchronism with said reflective capabilities to produce a dark count according to one reflective capability and a light count according to another reflective capability;

means for comparing the sum of an adjacent dark and light counts with reference counts to produce upper and lower limit signals when said sum falls within a preselected range;

state counter means receiving said dark count, said light count, said upper and lower limit signals and producing state signals in accordance with said active states;

code assembly means receiving said data and sequentially assembling said data as a series of logic 1's and 0's in accordance with said reflective states, said code assembly means also comparing successive sequences of data and generating a compare signal when a preselected number of successful comparisons have been made;

utilization actuation means responsive to said compare signal for effecting the application of said logic 1's and 0's to a utilization means.

2. The system of claim 1 wherein said states are initiated and terminated coincident with the transitions between said reflective capabilities.

3. The system of claim 1 wherein said code assembly means includes data direction control means so that data received in reverse order is injected into said code assembly means in the same direction as data received in the forward direction.

4. The system of claim 3 wherein said code assembly means generates a compare signal only after two pairs of successive data sequences have been received.

5. The system of claim 4 wherein said utilization actuation means includes counter means for counting said compare signals and signal transfer means responsive to said counter means, said signal transfer means yielding a sequencing signal after said counter means yields an output pulse number which exceeds the number of logic 1's and 0's encoded on said label.

6. The system of claim 5 wherein said utilization actuation means further includes output buffer means and output register means responsive to said output buffer means, said output buffer means receiving said logic 1's and 0's coincident with the reception of the output signals of said counter means.

7. The system of claim 1 wherein said label segments define at least a label initiation state, a coded information state, and a label termination state, said initiation state being determined by a segment of one reflective capability, said termination state being determined by a segment of the other reflective capability, and said coded information state includes a plurality of coded pulse pairs, each of said coded pulse pairs including a segment of each reflective capability of different width to define a logic 1 or 0, dependent upon the reflective capability of the widest segment;

and wherein said code assembly means includes count comparator means for comparing said dark and light counts and generating said logic 1's and 0's.

8. The system of claim 7 wherein said initiation state and said termination state are defined by counts which exceed the count for the widest sigment of said coded pulse pairs.

9. The system of claim 8 wherein said initiation and termination states are determined by a maximum count of $N_3$, and the narrow segment of each coded pulse pair is determined by a maximum count of $N_2$, and the narrow segment of each coded pulse pair is determined by a minimum count of $N_1$, where $N_3 > N_2 > N_1$.

10. The system of claim 9 wherein said state counter sequentially generates said state signals when each of said counts $N_3$, $N_2$, and $N_1$ are received in proper sequence and generates a no-read signal when an invalid count or an invalid input is received.

11. The system of claim 1 wherein said label is carried on a container and further including container detector means for supplying a container-present signal to said system and an alarm signal when a failure occurs in the means for moving said container past said system.

12. The system of claim 1 further including means for moving a container carrying at least one label;

means for scanning said container and said label with energy;

and means for receiving energy reflected from said label and actuating said system.

13. The system of claim 12 wherein said container carries a plurality of labels;

and said state counter includes selector switch means for selecting the number of labels to be decoded by said system.

14. The system of claim 13 wherein said label segments define at least a label initiation state, a coded information state, and a label termination state, said initiation state being determined by a segment of one reflective capability, said termination state being determined by a segment of the other reflective capability, and said coded information state including a plurality of coded pulse pairs, each of said coded pulse pairs including a segment of each reflective capability of different width to define a logic 1 or 0, dependent upon the reflective capability of the widest segment;

and wherein said code assembly means includes count comparator means for comparins said comparing and light counts and generating said logic 1's and 0's.

15. The system of claim 14 wherein said initiation and termination states are determined by a maximum count of $N_3$, and the narrow segment of each coded pulse pair is determined by a maximum count of $N_2$, and the narrow segment of each coded pulse pair is determined by a minimum count of $N_1$, where $N_3 > N_2 > N_1$.

16. The system of claim 15 wherein said labels are spaced in a direction perpendicular to the direction of scanning and are alternately arranged so that the label initiation segments of alternate labels are different reflectivities.

17. The system of claim 16 wherein said state counter means further includes means for generating a dark bar initialize signal and a light bar initialize signal;

wherein said code assembly means includes data direction control means so that data received in reverse order from alternate labels is injected into said code assembly means in the same direction as data received in the forward direction, the direction of data injection into said code assembly means being controlled by said initialize signals.

18. The system of claim 17 wherein said state counter further includes label count signal generation means;

and wherein there are $n$ labels on said container and n data transfer means individually responsive to said label count signals so that the data from each of said labels is separately received by said utilization means.

19. The system of claim 18 wherein said labels are rectangular and are scanned in a direction substantially perpendicular to said segments.

20. The system of claim 15 wherein said labels have radial symmetry about a center section so that a single scan through said label produces two sets of identical data in reverse;

said center defining said label termination state and said label initiate state being defined by the segment forming the circumference of said label.

21. The system of claim 20 wherein said code assembly means includes data direction control means so that data received in reverse order from different halves of said label is injected into said code assembly means in the same direction as data received in the forward direction;

the direction of data injection into said code assembly means being reversed by the state defined by said center section.

22. The system of claim 21 wherein there are a plurality of said labels spaced in a direction normal to the direction of scan so that only one label is scanned by all scans passing through the center of a label.

23. The system of claim 21 wherein said count of $N_3$ is a maximum of the diameter of said center section and a minimum of 50 percent of said diameter.

24. The system of claim 23 wherein said state counter further includes label count signal generation means;

and wherein tbere are $n$ labels on said container and $n$ data transfer means individually responsive to said label count signals so that the data from each of said labels is separately received by said utilization means.

25. The system of claim 12 wherein said container and said means for scanning are separated by a distance $D$;

and further including means for varying the repetition rate of said clock as a function of said distance.

26. The system of claim 25 wherein said means for varying said repetition rate includes voltage controlled oscillator means, and clock generator means having an output frequency dependent upon the frequency of said oscillator, and distance selector means for varying the output frequency of said clock generator.

27. The system of claim 26 wherein said oscillator is controlled through a function generator, the output of which varies in accordance with the expression:

$$V_o = V_n\,[K_1 + (K_2)/(\cos\theta)^2]$$

where:

$V_o$ = output voltage $V_n$ = applied voltage $\theta$ = angle between the scan line and the normal between the object and scanner.

28. The system of claim 18 wherein the label on one extreme is identified as the most significant label and the label on the other extreme is identified the least significant label;

and wherein said state counter includes container direction control means for generating a most significant label first signal or a least significant label first signal, depending upon the direction of movement of said container.

29. The system of claim 24 wherein the label on one extreme is identified as the most significant label and the label on the other extreme is identified the least significant label;

and wherein said state counter includes container direction control means for generating a most significant label first signal or a least significant label first signal, depending upon the direction of movement of said container.

30. The system of claim 28 wherein said means for scanning includes a laser and a reflective prism, said prism being rotatably interposed said laer and said container so that rotation of said prism causes scanning of said container.

31. The system of claim 20 wherin said means for scanning includes a laser and a reflective prism, said prism being rotatably interposed said laser and said container so that rotation of said prism causes scanning of said container.

32. The system of claim 30 wherein said means for receiving includes a photomultiplier and an interference filter interposed said prism and photomultiplier, said filter being positioned to receive reflected energy from a prism surface different from the transmitting surface.

33. The system of claim 31 wherein said means for receiving includes a photomultiplier and an interference filter interposed said prism and photomultiplier, said filter being positioned to receive reflected energy from a prism surface different from the transmitting surface.

* * * * *